US009292852B2

(12) United States Patent  
Coulter et al.

(10) Patent No.: US 9,292,852 B2  
(45) Date of Patent: Mar. 22, 2016

(54) SYSTEM AND METHOD FOR APPLYING STORED VALUE TO A FINANCIAL TRANSACTION

(75) Inventors: Todd R. Coulter, Rancho Murieta, CA (US); Mordechai E. Kaplinsky, Brooklyn, NY (US); Christopher E. Lewis, Tempe, AZ (US); Jeffery A. Warmington, Wellington, FL (US)

(73) Assignee: FonWallet Transactions Solutions, Inc., Rancho Murieta, CA (US)

( * ) Notice: Subject to any disclaimer, the term of this patent is extended or adjusted under 35 U.S.C. 154(b) by 340 days.

(21) Appl. No.: 12/859,213

(22) Filed: Aug. 18, 2010

(65) Prior Publication Data

US 2010/0312636 A1 Dec. 9, 2010

Related U.S. Application Data

(63) Continuation-in-part of application No. 12/557,457, filed on Sep. 10, 2009, now Pat. No. 8,099,368.

(60) Provisional application No. 61/112,749, filed on Nov. 8, 2008.

(51) Int. Cl.
*G06Q 20/00* (2012.01)
*G06Q 20/42* (2012.01)
(Continued)

(52) U.S. Cl.
CPC ............... *G06Q 20/42* (2013.01); *G06Q 20/10* (2013.01); *G06Q 20/20* (2013.01); *G06Q 20/32* (2013.01); *G06Q 20/322* (2013.01); *G06Q 20/40* (2013.01);
(Continued)

(58) Field of Classification Search
CPC ..................................................... G06Q 20/00

USPC ............................................................ 705/67
See application file for complete search history.

(56) References Cited

U.S. PATENT DOCUMENTS 6,999,943 B1 2/2006 Johnson et al.
7,357,310 B2 4/2008 Calabrese et al.
(Continued)

FOREIGN PATENT DOCUMENTS

JP 2007018043 A * 1/2007
JP 2011-118898 A 6/2011

OTHER PUBLICATIONS

International Search Report and Written Opinion for PCT/US09/63641; Applicant: FonWallet Transaction Solutions, Inc.; Mailing Date: Dec. 15, 2009, 8 pages.
(Continued)

*Primary Examiner* — James A Reagan

(57) ABSTRACT

A transaction processing service operates as an intermediary between acquirers of financial transaction requests and issuing institutions that process the financial transaction requests. The intermediary receives an authorization request generated based on a transaction initiated by a customer at a point of purchase. The intermediary service then determines one or more stored value items that can be applied to the transaction. Stored value items may be determined based on the customer's identity or based on transaction characteristics, such as the point of purchase or the transaction items. The service sends a transaction notification to a mobile device associated with the customer to notify the customer of the available stored value items. The service then applies the stored value items to pay a portion of the transaction amount and initiates a payment process to pay the remainder of the transaction amount.

40 Claims, 18 Drawing Sheets

(51) Int. Cl.
*G06Q 20/10* (2012.01)
*G06Q 20/20* (2012.01)
*G06Q 20/32* (2012.01)
*G06Q 20/40* (2012.01)
*G06Q 30/02* (2012.01)
*G06Q 40/02* (2012.01)

(52) U.S. Cl.
CPC ............ *G06Q 30/02* (2013.01); *G06Q 30/0238* (2013.01); *G06Q 40/02* (2013.01)

(56) References Cited

U.S. PATENT DOCUMENTS

| | | |
|---|---|---|
| 2002/0138445 A1 | 9/2002 | Laage et al. |
| 2002/0143634 A1 | 10/2002 | Kumar et al. |
| 2003/0216996 A1 | 11/2003 | Cummings et al. |
| 2004/0230525 A1* | 11/2004 | Barsade et al. ................. 705/40 |
| 2005/0222949 A1 | 10/2005 | Inotay et al. |
| 2005/0251440 A1* | 11/2005 | Bednarek ........................ 705/10 |
| 2008/0010191 A1 | 1/2008 | Rackley, III et al. |
| 2008/0010215 A1 | 1/2008 | Rackley, III et al. |
| 2008/0172317 A1 | 7/2008 | Deibert et al. |
| 2008/0288351 A1* | 11/2008 | Leung et al. .................... 705/14 |
| 2009/0192904 A1 | 7/2009 | Patterson et al. |
| 2009/0325542 A1 | 12/2009 | Wentker et al. |
| 2010/0121726 A1 | 5/2010 | Coulter et al. |
| 2010/0121767 A1 | 5/2010 | Coulter et al. |
| 2010/0312657 A1 | 12/2010 | Coulter et al. |
| 2010/0312700 A1 | 12/2010 | Coulter et al. |

OTHER PUBLICATIONS

Non-Final Office Action, U.S. Appl. No. 12/859,205, Mail Date Nov. 7, 2011, 21 pages.
Final Office Action, U.S. Appl. No. 12/557,453, Mail Date Mar. 30, 2011, 19 pages.
Final Office Action, U.S. Appl. No. 12/557,457, Mail Date Apr. 27, 2011, 17 pages.
Krueger, Malte. The Future of M-payments—Business Options and Policy Issues—Background Paper No. 2 Electronic Payment Systems Observatory (ePSO) (Aug. 2011), retrieved online Sep. 29, 2011 at http://ftp/jrc.es/EURdoc/eur19934en.pdf, 33 pages.
Non-Final Office Action, U.S. Appl. No. 12/557,457, Mail Date Sep. 28, 2010, 24 pages.
Non-Final Office Action, U.S. Appl. No. 12/557,453, Mail Date Oct. 5, 2010, 16 pages.
Notice of Allowance, U.S. Appl. No. 12/557,457, Mail Date Oct. 12, 2011, 17 pages.
Final Office Action, U.S. Appl. No. 12/859,205, Mail Date Jun. 13, 2012, 9 pages.
Non-Final Office Action, U.S. Appl. No. 12/859,203, Mail Date Feb. 8, 2012, 5 pages.
Notice of Allowance, U.S. Appl. No. 12/557,453, Mail-Date Apr. 3, 2012, 19 pages.
Notice of Allowance, U.S. Appl. No. 12/859,203, Mail-Date Apr. 27, 2012, 8 pages.
Notice of Allowance, U.S. Appl. No. 12/859,205, Mail-Date Oct. 9, 2012, 18 pages.

* cited by examiner

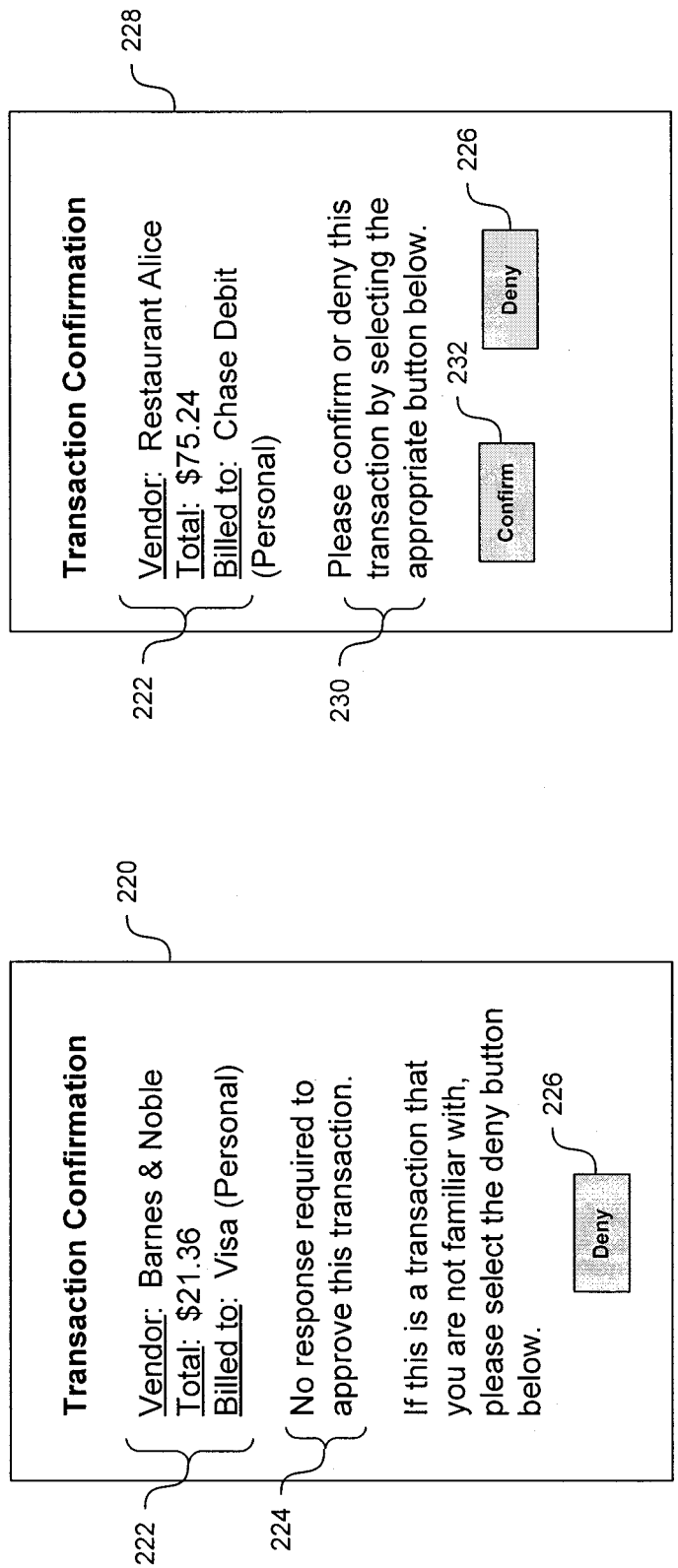

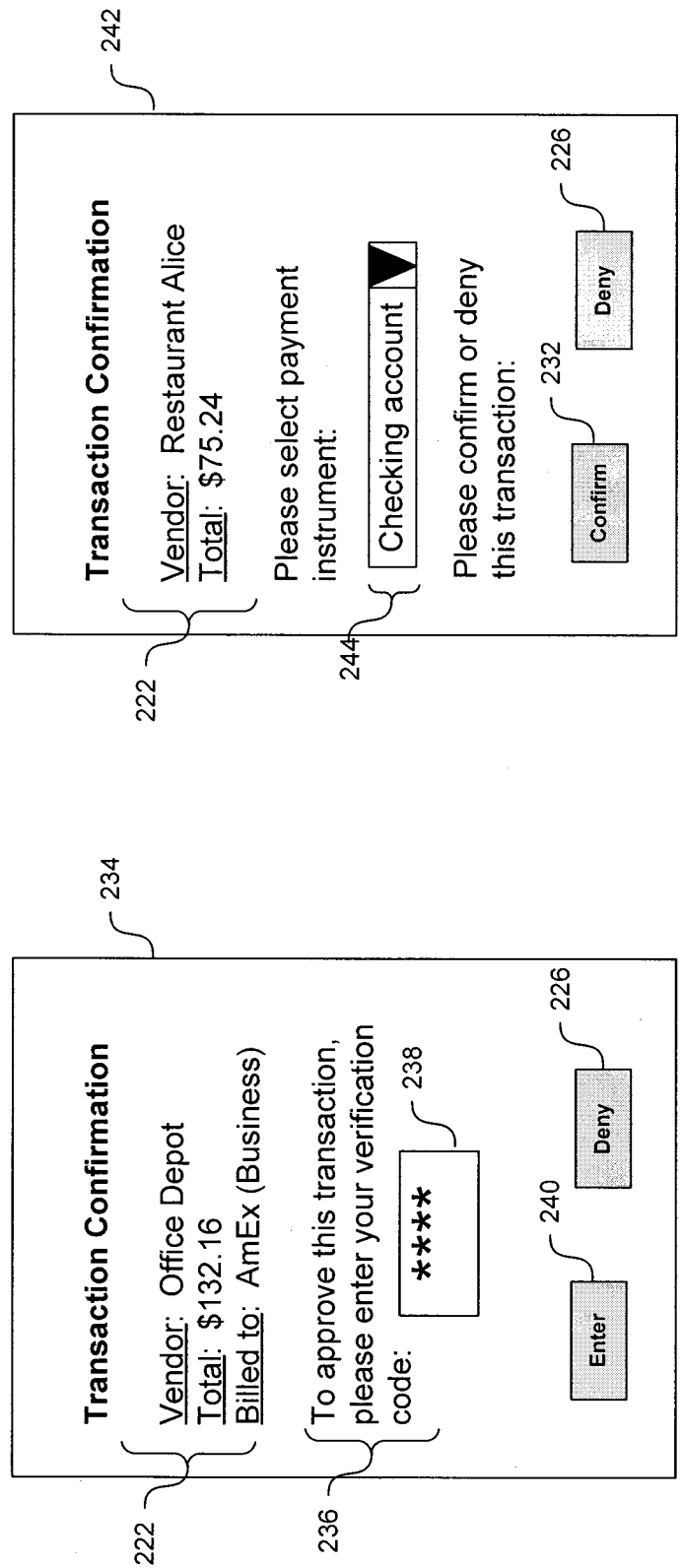

US 9,292,852 B2

SYSTEM AND METHOD FOR APPLYING STORED VALUE TO A FINANCIAL TRANSACTION

CROSS-REFERENCE TO RELATED APPLICATIONS

This application is a continuation-in-part of U.S. patent application Ser. No. 12/557,457 filed Sep. 10, 2009 now U.S. Pat. No. 8,099,368, entitled "Intermediary Service and Method for Processing Financial Transaction Data with Mobile Device Confirmation," which claims the benefit of U.S. Provisional Application No. 61/112,749, entitled "Mobile Card Access & Authorization," filed on Nov. 8, 2008.

BACKGROUND

Companies that participate in electronic transaction systems (e.g., transaction systems that process credit cards, debit cards, etc.) must balance a number of competing concerns in their interactions with the systems. As businesses, companies must track their costs in dealing with transaction systems. For example, merchants who accept credit cards are subject to various fees when processing transactions. Merchants may therefore decide to accept certain credit cards and reject others, or require a minimum charge amount when accepting a card for payment, in order to reduce fees. In addition, merchants must track and make policy decisions about how they use and protect personal information associated with transactions. Government regulations and private contracts (e.g., with the credit card associations) set privacy and security requirements that banks and merchants must satisfy. The privacy and security requirements place limits on data security and encryption and also limit the types of data that can be transmitted using different formats. These concerns are interrelated because participants in the system pay lower fees when more customer information is provided with the transaction information. Fees are lower because the additional customer information can generally be retrieved only from the physical card itself, indicating that the card was present at the time of the transaction. Thus, a purchase at a brick-and-mortar business is charged a lower processing fee than a purchase on the Internet, because the brick-and-mortar business is able to transmit more customer information to the credit card company.

Consumers also balance competing concerns. Avoiding losses from fraudulent or erroneous transactions is a particular concern. Currently, some issuing institutions use automated systems that attempt to detect and reject suspicious transactions based on transaction characteristics (e.g., location, amount, etc.). However, these automated systems are often unsuccessful in differentiating legitimate transactions and fraudulent transactions. Otherwise, consumers can generally detect fraudulent or erroneous transactions only by reviewing their bill or statement to verify that every transaction is correct. Reviewing bills is inconvenient because it requires continual vigilance from the consumer. In addition, several days or weeks may pass before an erroneous or fraudulent transaction is detected. Thus, it would be useful to have payment systems that enable consumers to more efficiently detect these incorrect transactions.

Convenience is also a major concern for consumers. The average consumer may pay for purchases using multiple payment instruments, such as credit cards, debit cards, and gift cards. Each payment instrument has a separate card or token and a separate set of identifying information, such as credit/debit card numbers, that must be tracked. Managing multiple payment instruments can therefore be complicated and cumbersome. Thus, it would be useful to consumers to be able to manage multiple payment instruments in a simple fashion.

BRIEF DESCRIPTION OF THE DRAWINGS

FIGS. 3A-3D are representative user interfaces presented to a customer of a mobile device during a financial transaction.

DETAILED DESCRIPTION

Figure 1:
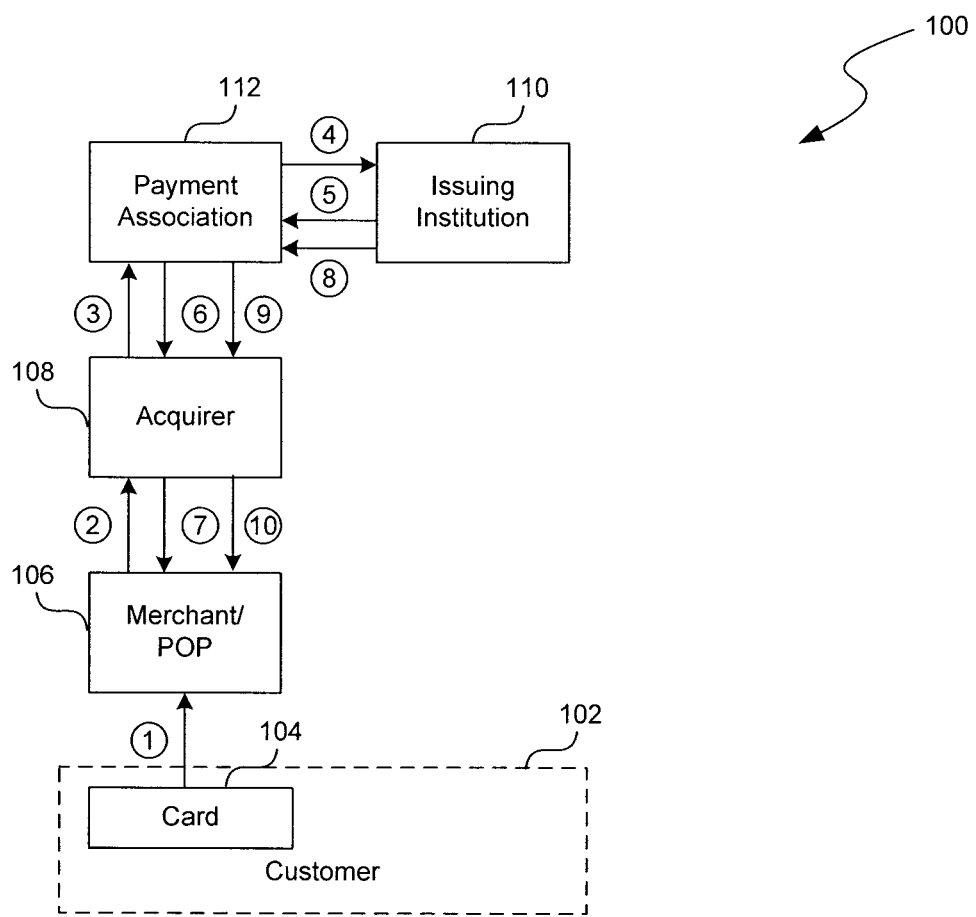
FIG. 1 is a block diagram of a representative environment for processing financial transaction data according to prior art methods.

A transaction processing service that operates as an intermediary between acquirers of financial transaction requests and issuing institutions that process the financial transaction requests is disclosed (hereinafter referred to as "the intermediary service" or "the service"). The intermediary communicates with an acquirer to provide account information that can be used by the acquirer to process the financial transaction requests. The intermediary service utilizes a customer's mobile device as an out-of-band communication channel to notify a customer of a received financial transaction request. In certain circumstances, before continuing to process the received financial transaction request the service must first receive the customer's confirmation of the transaction. By seeking out-of-band confirmation from a customer to a transaction, the disclosed intermediary service thereby significantly reduces the occurrence of fraud without changing or otherwise burdening standard merchant payment processes.

To initiate a transaction, a customer presents a card or token containing unique identifying information to a merchant in order to pay for a purchase. The token may be, for example, an RFID tag or other contactless device for providing the unique identifying information and may be contained in or attached to the customer's mobile device. The merchant transmits the unique identifying information to an acquirer (i.e., a financial institution that provides a clearinghouse service for consolidating financial transactions) in an initial authorization request. The acquirer recognizes that the initial authorization request is associated with the intermediary service based on the unique identifying information, and transmits at least part of the initial authorization request to the intermediary service. The intermediary service authenticates the request and retrieves stored customer information from a database based on the identifying information. The stored customer information includes an address of the customer's mobile device, a reference to one or more payment instruments associated with the customer, and a verification code associated with the customer's intermediary service account.

Using the retrieved address of the device, the intermediary service transmits a transaction notification message to the customer's mobile device. The transaction notification message may include the name or location of the point of purchase, the transaction amount, a listing of payment instruments that may be used to pay for the transaction, and/or other pertinent characteristics of the transaction. The transaction notification message may also specify a required response from the customer. The required response may vary depending on the requesting merchant, the type of transaction, the amount of the transaction, or other factor associated with the transaction (e.g., the type of goods or services being sold, an assessment of the likelihood of fraud, etc.). For example, a low-price transaction may require no response, a higher value transaction may require that the customer confirm the transaction, and a still higher value transaction may require that the customer confirm the transaction and provide a verification code in response to the transaction notification message. The transaction notification message is presented to the customer on the mobile device. The intermediary service may also support fallback methods for transmitting the transaction notification message to the customer in the event that the primary method of sending the message to the customer is not available.

If a response is required from the customer, the customer's response is received by the mobile device and transmitted to the intermediary service. The intermediary service continues processing of the initial authorization request based on the customer's response. If the customer fails to respond to the transaction notification message, rejects the transaction, or provides an incorrect verification code, the intermediary service sends a denial message to the acquirer and the transaction fails.

If the customer authorizes the transaction by confirming the transaction, or confirming the transaction and providing a correct verification code, the intermediary service transmits an information request to the issuing institution of a payment instrument that is to be used to complete the transaction. In response to the request, the issuing institution provides account information for the selected payment instrument. The intermediary service forwards the account information to the acquirer, which generates a modified authorization request based on the received account information. The acquirer then sends the modified request to the associated payment association in accordance with its standard practices. By providing the account information to generate the modified authorization request, the intermediary service allows a customer to easily select among multiple payment instruments while using a single token or identifier at the time of payment. In addition, the provided account information may include additional verification that enables the payment association to process the transaction with a lower fee.

In some embodiments, the intermediary service may maintain a record of a set of payment instruments that are available to each customer for purposes of a transaction. One or more payment instruments may be automatically selected for each transaction based on rules that are defined by the intermediary service, by the customer, or by the merchant. Alternatively, a customer may be allowed to select a payment instrument from a list of payment instruments that are provided in a transaction notification message that is transmitted by the service to the customer. The selected payment instrument or payment instruments determine the issuing institution or institutions to which the intermediary service sends the information request.

The intermediary service may also provide a rules module that stores a set of rules for processing transactions. Each rule specifies one or more conditions to be tested and one or more actions to be executed based on the tests. For each authorization request, the service determines the applicable rules to apply and tests conditions for each rule. Based on the test results, the service either executes or does not execute an associated action. Conditions may be specified based on transaction information, customer information, or other information. For example, a rule might specify a condition to test whether the transaction value is above a threshold value that requires special handling. Actions define the service's response to a particular result in testing a condition. To continue the previous example, the rule may include an action to specify a verification procedure to carry out when the transaction value exceeds the threshold value.

Some rules apply to all transactions, regardless of the customer initiating the transaction, while other rules apply to transactions from specified groups of accounts. Rules may be specified by any participant in the transaction chain, including the customer, the merchant, the issuing institution, and the intermediary service, or by a combination of rules from one or more of these parties.

The intermediary service may also provide functionality to store value for the benefit of customers. As used herein, "stored value" refers to any type of value stored by the intermediary service that can be used to pay a portion of a transaction. A "stored value item" is a particular unit of stored value that may be applied to a transaction. Each stored value item has an associated value, which may be stored as a currency amount measured in a US or foreign monetary unit (e.g., $1.95, €4) or as a percentage of a transaction amount (e.g., a 10% off coupon)). The value may also be denominated in non-currency units (e.g., "points") that can be converted to a currency value using a conversion rate at the time of a transaction. In some embodiments, the associated value for a stored value item varies depending on characteristics of the transaction, such as the time of the transaction or the merchant. For example, the associated value for a stored value item that is a coupon may be 10% off if the item is used between 2 PM and 4 PM (e.g., during typical periods of low traffic) and 5% off at other times. Similarly, the system may convert non-currency units to a currency amount using a rate that varies depending on transaction characteristics. One skilled in the art will appreciate that other types of stored value could also be used. Each stored value item may also have an associated customer identifier, one or more conditions for applying the stored value, and an expiration date. Some stored value items are unconditional. These items (referred to as "vouchers") are generally associated with a particular customer and can be used for any transaction. Customers may receive vouchers as payments or gifts from other customers (e.g., as a gift card), as rebates from merchants or manufacturers, or as refunds from merchants. Vouchers may have an expiration date or may retain value until redeemed by a customer.

Other stored value items have conditions that restrict the transactions that they may be used for. These items are referred to as "coupons" and function similarly to traditional paper coupons. For example, the service may store coupons that can only be used for particular items or at particular merchants. The service may be configured to automatically provide coupons to the customer based on characteristics of a particular transaction or the customer's transaction history. For example, the intermediary service may provide a coupon when the customer purchases a particular item or when the customer purchases items from a particular merchant. Similarly, the service may provide a coupon based on a series of purchases from a merchant or based on repeated purchases of a particular product. The service may allow a customer to use a coupon immediately or save the coupon for later use. Each saved coupon may have a range of effective dates or times, a specified number of uses, or both an effective date/time range and a number of uses. For example, a coupon may be effective for the month of June, for a time period from 2 PM to 4 PM each day, or from the date the coupon was issued to an expiration date (e.g., until July 4th). If the current date does not fall within the effective dates of the coupon, the service does not allow the coupon to be utilized by the customer. If a coupon has expired (i.e., the current date falls after the latest effective date for the coupon), or if or the number of uses for the coupon has been exhausted, the service may remove the coupon from the customer's account.

During operation, the intermediary service generally processes stored value after or in conjunction with the processing of rules by the rules module. The service determines relevant information from the authorization request, such as customer information and merchant information, and uses the information to determine whether there are any applicable stored value items. The service then determines whether to apply the stored value items to the transaction. In some cases, the service sends a transaction notification indicating the available stored value items and requesting that the customer select which items to apply. Alternatively, the service may be configured to automatically apply some or all available items. For example, the service may allow a customer to pre-authorize some items to be automatically applied without requiring additional verification. Items that are not pre-authorized may be excluded from use or applied based on the customer's response to a transaction notification. The service may also allow a coupon issuer to specify that its coupons should be automatically applied without requiring customer authorization. After determining which items to apply, the service uses the stored value items to reduce the transaction amount. The service then proceeds with the payment process to request payment for the remainder of the transaction amount.

The intermediary service may also provide functionality to enable a customer to selectively change the status of an account by activating or deactivating the account. In some embodiments, the intermediary service manages account status using the rules module capabilities discussed above. In these embodiments, the intermediary service allows the customer to define a rule to specify time intervals when an account may be used. When an authorization request is received, the intermediary service rejects the request if the time is not within an authorized time interval.

In other embodiments, the intermediary service provides an interface for customers and manages account status, while the issuing institution manages activation or deactivation using the account status information. In these embodiments, a customer communicates with the intermediary service to direct the service to change the account status. The intermediary service determines the account's issuing institution and provides an indication to the issuing institution of the current status of the account (or of the change in status). In some embodiments, the intermediary service provides the indication by transmitting a message to the issuing institution to notify it of the new status. Alternatively, the intermediary service may store the account status information in its own database. The issuing institution may then request account status from the intermediary service whenever it needs the information, such as when it receives an authorization request. An advantage of the issuing institution-managed implementation is that it allows the intermediary service to control account status for all uses of the account, even for authorization requests that do not pass through the intermediary service. At the same time, this implementation takes advantage of the fact that the customer is already registered with intermediary service, so that the intermediary service can provide verification procedures to confirm changes in account status.

In some embodiments, a customer may provide the unique identifying information to an online merchant via a computer interface, such as via a checkout process implemented on a web site. The online merchant transmits the unique identifying information to an acquirer (i.e., a financial institution that provides a clearinghouse service for consolidating financial transactions) in an initial authorization request. The transaction is then processed by the intermediary service in a similar manner to transactions received from a brick-and-mortar merchant. Alternatively, the online merchant may bypass the acquirer by transmitting the information directly to the intermediary service. The transaction may then be processed by the intermediary service as discussed above, with the online merchant acting in the acquirer's role.

When sensitive account information is transmitted through the intermediary service from a financial institution to an acquirer, the account information may remain in an encrypted form that cannot be interpreted or used by the intermediary service. For example, the intermediary service may allow customers to request payment with a debit card that requires a PIN or other unique code. Rather than having the customer enter the PIN or unique code, the PIN or code is transmitted by a financial institution across the intermediary service in an encrypted manner such that it cannot be utilized by the service. Only the intended receiving party has the necessary information to decrypt and use the received PIN or code. In this manner, customers are able to utilize the intermediary service for transactions like debit purchases. Such transactions are normally not available in certain environments because of rules pertaining to the handling and processing of PINs.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of a representative environment 100 in which various parties process financial transaction data according to prior art methods. In the prior art environment, a transaction is initiated in step 1 when a customer 102 tenders a credit or debit card 104 at a point of purchase associated with a merchant 106. As used herein, "point of purchase" refers to any point where a card is used to pay for a good or service. A point of purchase may include, for example, a store, a vending machine, an online retailer, a restaurant, a contractor, a provider of services, etc.

To obtain identifying information contained on a tendered card and initiate the transaction process, the customer 102 or the merchant 106 may swipe the card 104 through a card reader and, if required, enter a PIN or code. Alternatively, for a purchase made via a website, phone, or other network-accessible service, the customer 102 may provide a card number, associated name, and/or other identifying information to the merchant. The identifying information that is obtained from the card depends on the type of transaction and the available systems for reading the card. Standard credit and debit cards include several sets of information referred to as Track 1 and Track 2. The data on Track 1 is considered public, while the data on Track 2 is considered private and must be transmitted using special security protections dictated by the issuing bank or the payment association (e.g., Visa, MasterCard, etc.). However, transaction fees are lower if data from Track 2 is also provided. Because of the security restrictions and the lack of a reader that can read the tracks, data from Track 2 is generally not available for online, mail order, or telephone transactions (generally referred to as "card not present transactions").

After receiving identifying information, the merchant 106 in step 2 sends an authorization request to an acquirer 108. The authorization request includes transaction information such as the identifying information, point of purchase information (e.g., a merchant's name or identifier), and the transaction details (e.g., price, products, quantities, fees and taxes). The acquirer 108 is generally a separate financial institution that functions as a clearinghouse for many electronic transactions. The acquirer 108 in step 3 forwards the authorization request to a payment association 112, which forwards the request to an issuing institution 110 in step 4. The issuing institution 110 may be, for example, a bank or other institution that provided the credit or debit card.

After receiving the authorization request, the issuing institution 110 evaluates the request by verifying the identifying information and the transaction amount. The issuing institution 110 then authorizes the transaction in step 5 by transmitting an authorization message to the payment association 112, which forwards the message to the acquirer 108 in step 6. In step 7, the acquirer 108 forwards the authorization message to the point of purchase 106, which records the completed transaction. At a later time, the issuing institution 110 provides payment for the transaction by transmitting the funds in step 8 to the payment association 112, which forwards the payment to the acquirer 108 in step 9. In the final step, the acquirer forwards the funds to the point of purchase 106 in step 10.

Figure 2A:
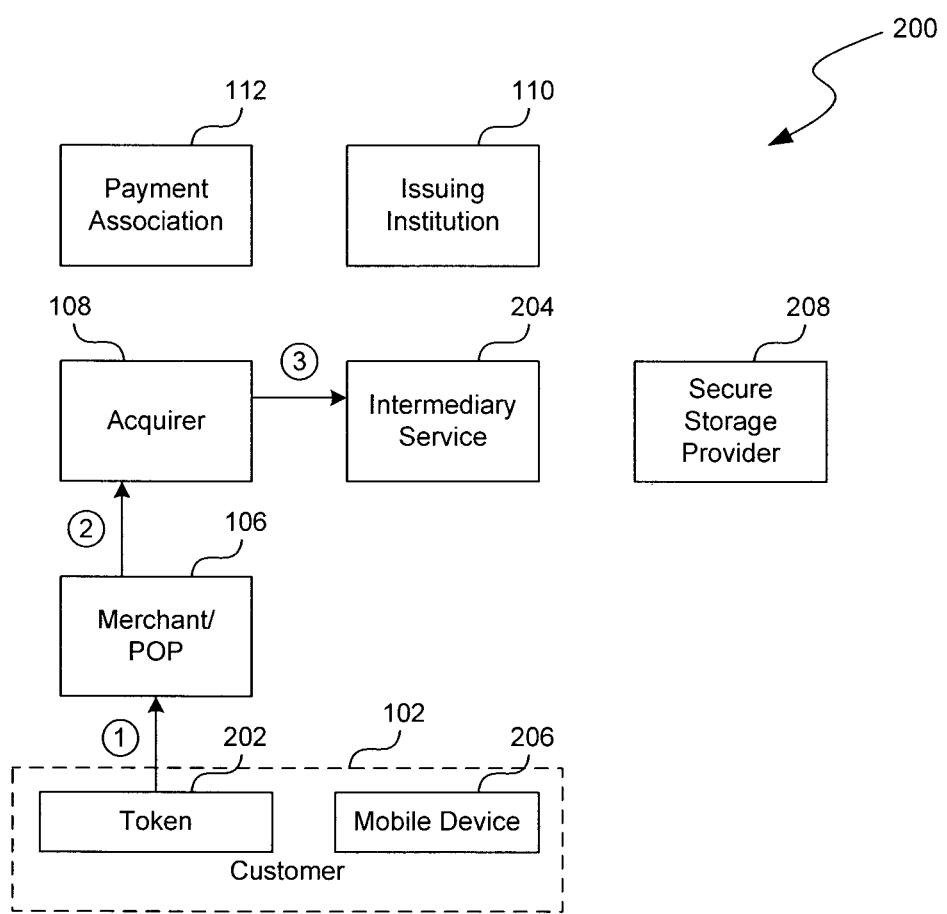
FIG. 2A is a block diagram that illustrates communication steps for sending an authorization request to an intermediary service.
Figure 2B:
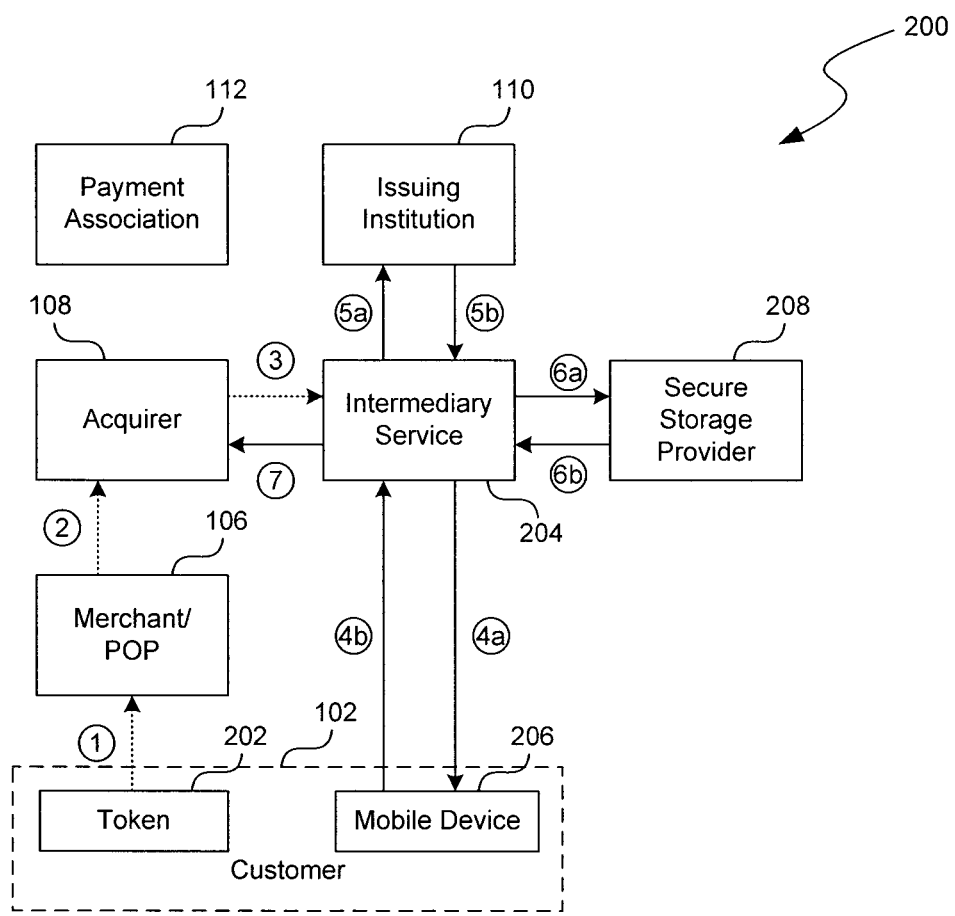
FIG. 2B is a block diagram that illustrates a two-step authorization process performed by the intermediary service.
Figure 2C:
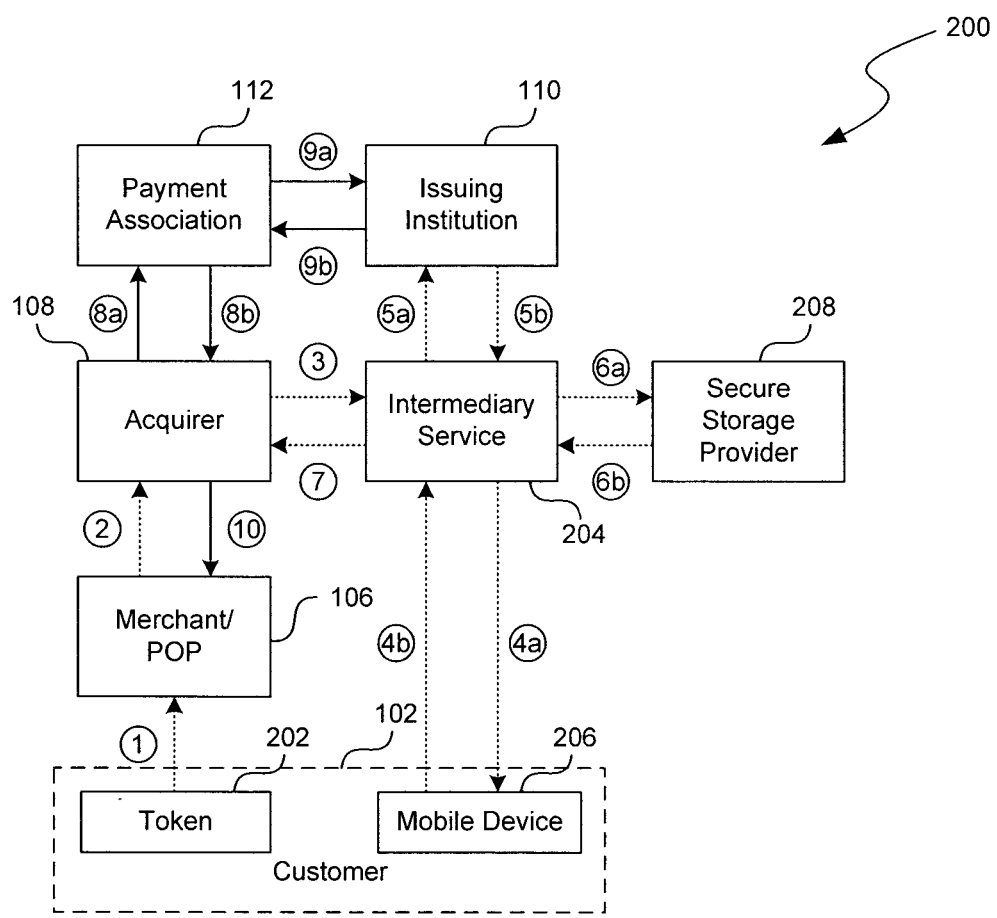
FIG. 2C is a block diagram that illustrates a process for authorizing a transaction using a modified authorization request.

FIGS. 2A, 2B, and 2C illustrate an environment 200 in which an intermediary service 204 operates and depicts the order in which various service and system modules involved in the transaction communicate in order to authorize and facilitate the completion of a specific transaction. FIG. 2A illustrates the communication steps for sending an initial authorization request to the intermediary service. A transaction begins in step 1 when a customer 102 uses a token 202 to provide unique identifying information to the merchant 106 at a point of purchase (POP) in order to make a purchase. As used herein, "token" is a generic term that refers to various means for providing the unique identifying information to the merchant 106. For example, a token may be a magnetic strip on a credit or debit card, a radio frequency identification (RFID) tag embedded in a card or mobile device, an optical pattern that is scanned by a scanner (e.g., a bar code) or similar or different technologies for conveying identifying information to the merchant. As discussed above, the identifying information may be provided at the point of purchase by swiping a card or by the customer 102 providing the information such as by typing identifying information using a keyboard (e.g., when purchasing at a website). The point of purchase may alternatively receive the information by detecting, through the use of a radio frequency identification (RFID) reader, an RFID token or other identification token associated with the card or with the customer's mobile device. The token 202 may be issued by the intermediary service 204 and is generally not associated with the customer's credit or debit cards. The unique identifying information may be an alpha-numeric code, a sixteen digit number similar to a credit card number, or one or more pieces of data that uniquely identifies the customer. The point of purchase 106 then generates the initial authorization request based on the received identifying information, point of purchase information, and transaction information and transmits the initial authorization request to the acquirer 108 in step 2. In some embodiments, the initial authorization request includes a unique transaction identifier. The transaction identifier may be retained throughout the authorization process such that every participant can use it to identify the transaction.

Rather than send the initial authorization request directly to the payment association 112, the acquirer 108 in step 3 sends at least part of the data from the initial authorization request to the intermediary service 204. The acquirer is able to route the initial authorization request to the intermediary service 204 because the identifying information transmitted in the authorization request identifies the initial authorization request as being associated with a customer 102 having an account with the intermediary service 204. After receiving the data from the initial authorization request from the acquirer 108, as will be discussed in additional detail herein, the intermediary service 204 authenticates the request to ensure that the request has been issued from a valid acquirer and the transaction is valid. Among other steps, the intermediary service 204 also retrieves customer information associated with the transaction. The customer information includes an address of a mobile device that is associated with the customer, one or more payment instruments (e.g., credit cards, debit cards, bank accounts, etc.) that are associated with the token 202, and a verification code that is associated with the customer, the token, or with a particular payment instrument. The customer information may also include any customer-defined rules on how such payment instruments are to be applied to the transaction.

FIG. 2B illustrates a two-step authorization process performed by the intermediary service. After authenticating the initial authorization request from the acquirer 108, at a step 4*a* the intermediary service 204 transmits a transaction notification message to a mobile device 206 that is associated with the customer. The mobile device may be a mobile phone, a smart phone, a media player (e.g., an Apple iPod, or iTouch), a mobile game device (e.g. a Nintendo GameBoy, a Sony PSP), a personal digital assistant (PDA), an email device (e.g., a Blackberry), or any other device that may send and receive wireless transmissions. The transaction notification message is transmitted to the mobile device via an XMPP message using the retrieved address of the mobile device. The XMPP message may be sent using a data channel, such as a data network implementing TCP/IP provided by a wireless service provider. The message may be sent to a standard TCP port, such as port 5222. The retrieved address may be, for example, a telephone number, network address, or e-mail address associated with the mobile device. The transaction notification message includes transaction information such as the amount, time, or location of the transaction. The transaction notification message may also request the customer 102 to provide information to continue the transaction, such as to provide a transaction confirmation, a customer-specific, token-specific, or payment instrument specific) verification code, and/or a selection of a payment instrument to use for the transaction.

In the event that the intermediary service 204 is unable to transmit the transaction notification message to the mobile device, the intermediary service may support fallback methods for transmitting a transaction notification message to the customer. For example, in the event that the intermediary service is unable to communicate with the mobile device using an XMPP-formatted message, the service may also send the transaction notification message to the device using a short message service (SMS) message, an email message, or through another messaging channel. In some embodiments, the intermediary service may call the mobile device (if the mobile device has voice capability) and may use an Interactive Voice Response (IVR) system to solicit the confirmation from the customers. If the mobile device cannot be reached via any channel, in some embodiments the intermediary service 204 transmits the transaction notification message to a different device capable of receiving data messages that is associated with the customer, such as a personal computer. Alternatively, the intermediary service may attempt to communicate with the customer through a land-line telephone. The intermediary service may maintain a prioritized list of fallback methods to use, and may proceed through the list until the transaction notification message is delivered to the customer or until a certain period has elapsed and the service declares a delivery failure.

FIGS. 3A-3D are representative screenshots of a transaction notification message that may appear to a customer of a mobile device. Although the figures depict each example message separately, portions of the messages shown in FIGS. 3A-3D may in some cases be combined in a single message. FIG. 3A depicts a representative screenshot 220 associated with a first notification message. The notification message includes a region 222 that contains details of the financial transaction, such as a vendor (in the depicted example, a Barnes & Noble bookstore), a total amount being charged ($21.36), and a financial instrument that is being used to complete the transaction (a personal Visa card, automatically selected as a result of a service, customer, or merchant rule). For transactions under a first threshold, the service may not require a customer to confirm that the transaction should take place. In the depicted example, the notification message therefore includes a message 224 to the customer indicating that no response is required to approve the transaction. If, however, the customer is unaware of the transaction and therefore believes that the transaction may be a fraudulent one, the customer is presented with a "deny" button 226. By selecting the deny button, the customer is able to notify the intermediary service that the transaction is fraudulent or in error and thereby cause the intermediary service to terminate the transaction.

FIG. 3B depicts a representative screenshot 228 associated with a second notification message. The notification message includes a region 222 that contains details of the financial transaction, such as a vendor (in the depicted example, a restaurant), a total amount being charged ($75.24), and a financial instrument that is being used to complete the transaction (a debit card, automatically selected as a result of a service, customer, or merchant rule). For transactions between the first threshold and a second threshold, the service may require a customer to confirm that the transaction should take place. In the depicted example, the notification message therefore includes a message 230 to the customer indicating that the customer must confirm or deny the transaction. To confirm the transaction, the customer may select a "confirm" button 232. By selecting the confirm button, the customer is able to notify the intermediary service that the transaction should proceed. To deny the transaction, the customer selects the "deny" button 226. Selecting the deny button notifies the intermediary service that the transaction is fraudulent or in error and thereby cause the intermediary service to terminate the transaction.

FIG. 3C depicts a representative screenshot 234 associated with a third notification message. The notification message includes a region 222 that contains details of the financial transaction, such as a vendor (in the depicted example, Office Depot), a total amount being charged ($132.16), and a financial instrument that is being used to complete the transaction (a business American Express card, automatically selected as a result of a service, customer, or merchant rule). For transactions above the second threshold, the service may require a customer to confirm that the transaction should take place by entering the customer's verification code. In the depicted example, the notification message therefore includes a message 236 to the customer indicating that the customer must enter the verification code. A text entry box 238 is provided, which displays a default character (e.g., "*") as an additional security measure as the customer keys in their verification code. After entry of the code, the customer selects an "enter" button 240 to confirm the transaction. By selecting the enter button, the customer notifies the intermediary service that the transaction should proceed, provided that the verification code entered by the customer matches the verification code that is associated with the customer, the token, or the payment instrument and stored by the service. To deny the transaction, the customer selects the "deny" button 226. Selecting the deny button notifies the intermediary service that the transaction is fraudulent and thereby cause the intermediary service to terminate the transaction.

FIG. 3D depicts a representative screenshot 242 associated with a fourth notification message. The notification message includes a region 222 that contains details of the financial transaction, such as a vendor (in the depicted example, a restaurant) and a total amount being charged ($75.24). Rather than the display of an automatically-selected payment instrument that will be used as the financial instrument in the transaction, however, the fourth notification message includes a drop-down menu 244 that allows the customer to affirmatively select the desired payment instrument that the customer would like to use for the transaction. For example, the customer may select a direct transfer from a checking account (depicted), or any debit, credit, gift certificate, or other holder of value that is associated with the account of the customer at the intermediary service. Once the customer has selected the desired financial instrument to use in the transaction, the customer then confirms that the transaction should proceed by selecting the "confirm" button 232. By selecting the confirm button, the customer is able to notify the intermediary service that the transaction should proceed using the selected financial instrument. To deny the transaction, the customer selects the "deny" button 226. Selecting the deny button notifies the intermediary service that the transaction is fraudulent or in error and thereby cause the intermediary service to terminate the transaction.

Returning to FIG. 2B, when required by the transaction notification message (such as required by the transaction notification messages in FIGS. 3B-3D), the customer 102 uses the mobile device 206 to send a confirmation message. Such a confirmation message is sent in a step 4b, and may confirm the transaction or deny the transaction in the transaction notification message. If the customer denies the transaction, the intermediary service ends further processing of the first authorization request and notifies the acquirer 108 that the request has been denied. The acquirer, in turn, notifies the merchant who then cancels the transaction.

If, however, the customer confirms the transaction in the notification message from the mobile device 206, or if the notification message does not require a confirmation receipt from the customer (such as in the transaction notification message in FIG. 3A) the intermediary service 204 generates an information request, which is used to obtain account information for a selected payment instrument. As described below, the account information is used to complete the process of authorizing the transaction. The information request is based on the initial authorization request, the customer's verification message, and the stored customer information. The information request is to be sent to the appropriate issuing institution with sufficient information to allow the issuing institution to provide the correct account information in response to the request.

If the retrieved customer information only contains a single payment instrument, the information request is constructed and transmitted to the issuing institution associated with the single payment instrument. If, however, the retrieved customer information includes multiple payment instruments, the intermediary service 204 may automatically determine which payment instrument is to be used for the transaction. The determination may be based on default rules that are maintained by the service. For example, the service may require that all transactions below a certain dollar value be processed as a debit transaction, and all transactions above the certain dollar value be processed as a credit card transaction. The determination may be based on rules that are specified by the merchant associated with the transaction. For example, a merchant may only accept a certain type of charge card and the customer may be required to use the charge card that is accepted by the merchant. The determination may also be based on rules that are defined by the customer, such as the use of one payment instrument for charges at restaurants and the use of another payment instrument for charges everywhere else. The customer may define processing rules based on many different factors, such as the location of the purchase, the point of purchase, and the day or date of the purchase. As an example, a customer might specify that a business credit card should be used for transactions occurring during regular business hours on weekdays, while a personal credit card should be used for transactions occurring on a weekend or after normal business hours on a weekday. In some circumstances, such as depicted in FIG. 3D, the transaction notification message that is transmitted to the customer contains a menu that allows the customer to select which payment instrument that they would like to use for the transaction. If such a selection is made by the customer, the intermediary service uses the selected payment instrument.

The service may also apply stored value items to pay a portion of the transaction amount prior to or in conjunction with requesting authorization for the remainder. In some embodiments, the service sends a listing of available stored value items to the customer in the transaction notification. The customer may then select individual items to apply to the transaction. After applying the stored value items, the intermediary service 204 reduces the transaction amount based on the value of the applied items.

The intermediary service 204 transmits the information request to an issuing institution 110 associated with the selected payment instrument. If the intermediary service is integrated with the issuing institution, the request may be directly sent to the issuing institution 110 in step 5a. The issuing institution 110 responds to the information request by providing account information associated with the selected payment instrument. In some embodiments, the account information is encrypted such that the information can be decrypted by the acquirer 108 but not by the intermediary service 204. This provides additional security by reducing the number of entities that have access to the account information. However, in other embodiments, the intermediary service 204 decrypts the account information after receiving it from the issuing institution and provides the account information to the acquirer using its own encryption key. Because the account information is obtained directly from the issuing institution, it may also include Track 2 information for the payment instrument, which increases the security and reduces the cost of the transaction.

After obtaining the account information from the issuing institution 110, the intermediary service 204 in step 7 sends the account information and, if modified, the modified transaction amount to the acquirer 108. The intermediary service 204 may also send a list of stored value items applied to the transaction. As discussed below, the acquirer 108 then generates a modified authorization request based on the initial authorization request, the modified or unmodified transaction amount, and the received account information associated with the selected payment instrument. In some embodiments, this is done by replacing the identifying information in the initial authorization request with the account information and replacing the original transaction amount with the appropriate transaction amount. If the intermediary service 204 sent a list of stored value items applied to the transaction, the acquirer 108 may also add the list of stored value items to the modified authorization request.

In those cases in which the intermediary service 204 does not have a direct relationship with the issuing institution 110 of the selected payment instrument, however, the intermediary service may obtain the necessary account information from a secure storage provider 208. The secure storage provider 208 is a data storage service that stores account information for payment instruments in a similar fashion to the issuing institution to enable the intermediary service to proceed with the transaction. The account information may be provided to the secure storage provider 208 at any time prior to the transaction, such as when the customer initially registers with the intermediary service. At a step 6a, a request is made to the secure storage provider 208 for account information associated with the customer's selected payment instrument. At a step 6b, the secure storage provider responds with the account information. The intermediary service 204 then provides the account information to the acquirer 108, which generates the modified authentication request as if the information had been obtained from the issuing institution 110.

FIG. 2C illustrates a process for authorizing a transaction using a modified authorization request. As shown in FIG. 2C, the process is executed in a similar manner to the process in FIG. 1. Thus, in step 8a, the acquirer sends the modified authorization request to the payment association 112, which in step 9a sends the request to the issuing institution 110 associated with the selected payment instrument. The issuing institution 110 authorizes the transaction based on the information in the modified authorization request (i.e., the account information provided through the intermediary service 204). In step 9b, the issuing institution 110 transmits an authorization message to the payment association 112, which forwards the authorization message to the acquirer 108 in step 8b. In step 10, the acquirer 108 transmits the authorization message to the point of purchase 106, which records the transaction. The payment process may then be carried out using the method discussed above. In some embodiments, the acquirer 108 also sends a copy of the authorization message or other transaction information (e.g., items purchased) to the intermediary service 204. The intermediary service 204 may then send a receipt message to the mobile device 206 to indicate that the transaction was authorized.

Figure 4:
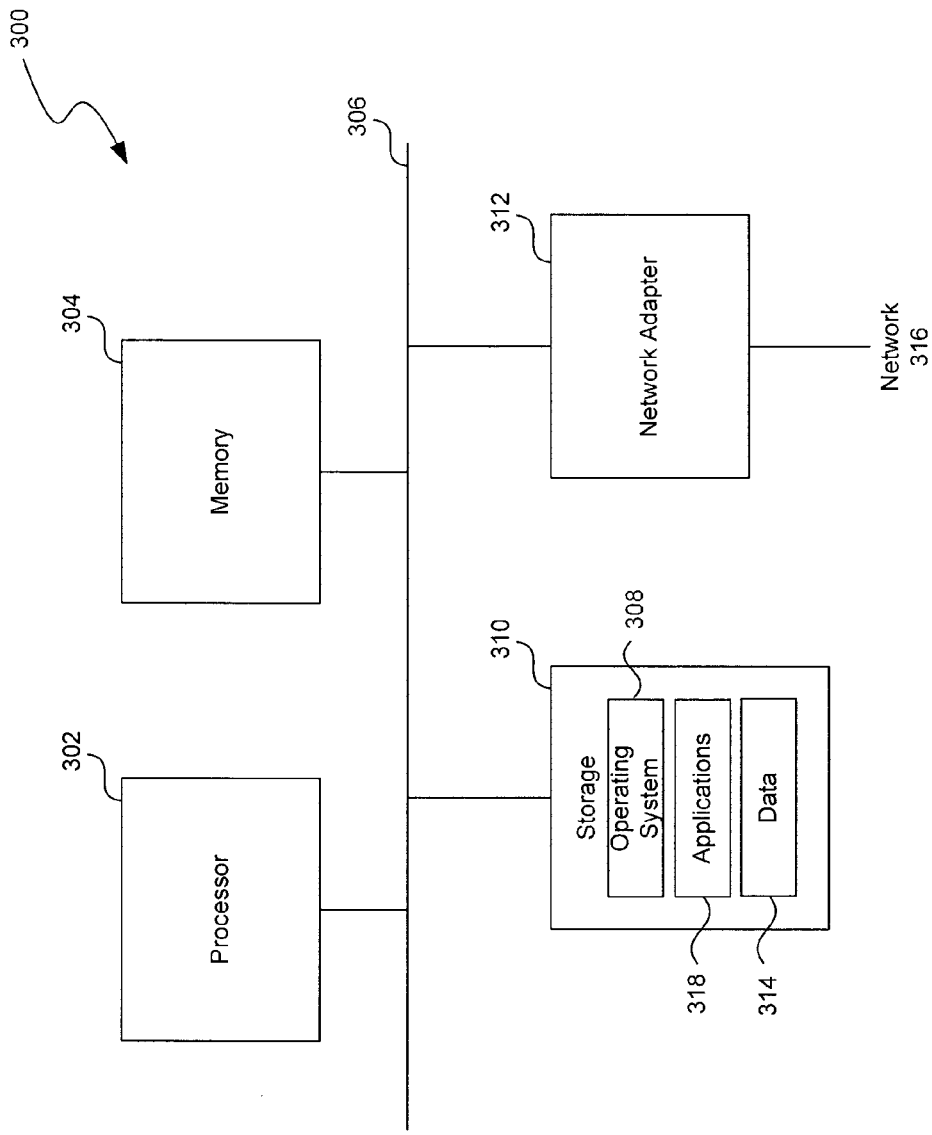
FIG. 4 is a block diagram of a representative server architecture.

FIG. 4 is a high-level block diagram showing an example of the architecture of a server 300. One or more servers 300 may be utilized by, for example, the intermediary service 204 or the acquirer 108 to implement the transaction processing depicted in FIGS. 2A-2C. The server 300 includes one or more processors 302 and memory 304 coupled to an interconnect 306. The interconnect 306 shown in FIG. 4 is an abstraction that represents any one or more separate physical buses, point-to-point connections, or both connected by appropriate bridges, adapters, or controllers. The interconnect 306, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 302 may include central processing units (CPUs) of the server 300 and, thus, control the overall operation of the server 300 by executing software or firmware. The processor(s) 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 304 represents any form of random access memory (RAM), read-only memory (ROM), flash memory, or the like, or a combination of such devices.

The software or firmware executed by the processor(s) may be stored in a storage area 310 and/or in memory 304, and typically includes an operating system 308 as well as one or more applications 318. Data 314 utilized by the software or operating system is also stored in the storage area or memory. A network adapter 312 is connected to the processor(s) 302 through the interconnect 306. The network adapter 312 provides the server 300 with the ability to communicate with remote devices, such as clients, over a network 316 and may be, for example, an Ethernet adapter.

Figure 5:
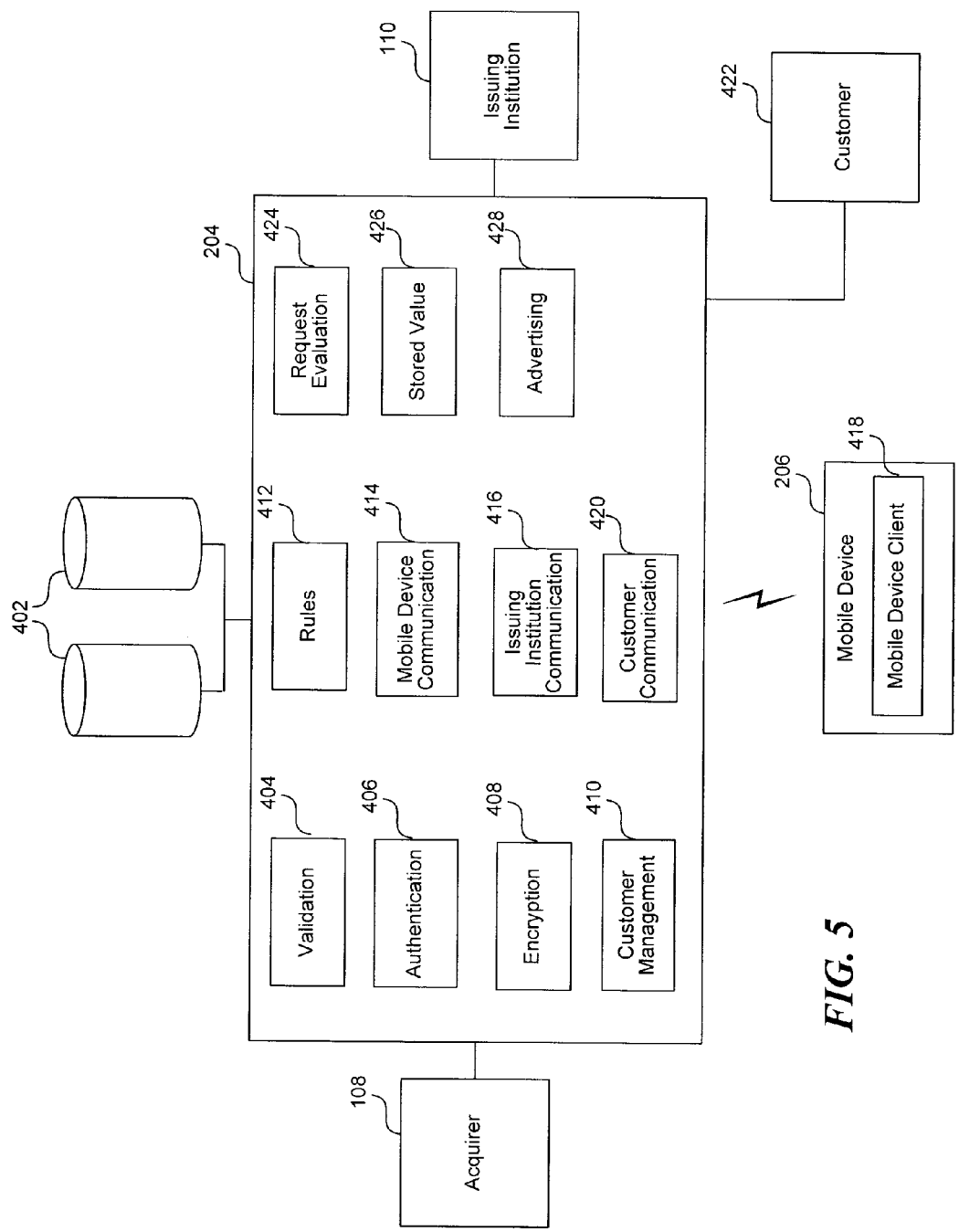
FIG. 5 is a logical block diagram of the intermediary service.

FIG. 5 illustrates a logical block diagram of the intermediary service 204. As discussed above, the intermediary service 204 receives an initial authorization request from the acquirer 108 and executes additional steps to notify the customer of the transaction and receive the customer's verification of the transaction. The intermediary service 204 also requests account information from the issuing institution 110 and provides the account information to the acquirer 108. Aspects of the service may be implemented as special purpose hard-wired circuitry, programmable circuitry, or as a combination of these. As will be described in additional detail herein, the intermediary service 204 includes a number of modules to implement the functions of the service. The modules and their underlying code and/or data may be implemented in a single physical device or distributed over multiple physical devices and the functionality implemented by calls to remote services. Assuming a programmable implementation, the code to support the functionality of the service may be stored on a computer readable medium such as an optical drive, flash memory, or a hard drive. One skilled in the art will appreciate that at least some of the individual modules may be implemented using application-specific integrated circuits (ASICs), programmable logic, or a general-purpose processor configured with software and/or firmware.

As previously described, the intermediary service 204 receives an initial authorization request from the acquirer 108 and transmits an information request to the issuing institution 110. The intermediary service 204 receives account information in response to the information request and provides the received account information to the acquirer 108. The intermediary service 204 also communicates with a mobile device 206 to notify the customer of a requested transaction and receive the customer's verification of the transaction. The intermediary service 204 also interacts with a storage component 402, which is configured to store configuration information and customer information. In particular, the storage component 402 stores data linking the identifying information received from the acquirer 104 to customer-specific information, such as the address of the mobile device 206, one or more payment instruments associated with the customer, and a verification code or codes associated with the customer, the token, or the payment instruments.

The intermediary service 204 includes various modules to assist in processing authorization requests. In particular, the intermediary service 204 includes a validation module 404, which is configured to receive initial authorization requests and validate that the requests are correctly formed. Validating initial authorization requests may include, for example, verifying that the request is correctly structured and includes all of the required data fields. In some embodiments, the authorization request is specified in extensible markup language (XML). In these embodiments, validation includes determining that the XML is well-formed.

The intermediary service 204 also includes an authentication module 406, which is configured to authenticate the sender of the authorization request. Authentication is used to avoid having an imposter pose as a legitimate acquirer for the purpose of submitting fraudulent requests for payment. The authentication module 406 may authenticate the acquirer using methods well known in the art. For example, the authentication module 406 may be configured to verify a digital signature associated with the acquirer and contained in an initial authorization request or in an authentication exchange completed prior to receiving an initial authorization request. Alternatively, the authentication module 406 may be configured to authenticate the acquirer by using a shared encryption key to decrypt a portion of the data in the authorization request. To do so, the authentication module 406 interacts with an encryption module 408, which is configured to execute an encryption algorithm that is complementary to an encryption algorithm that is used by the acquirer 108. The encryption module 408 is also used to encrypt messages sent from the intermediary service 204 to mobile devices 206, issuing institutions 110, and the data storage service 208. In some embodiments, the encryption module also decrypts messages received from the issuing institution and encrypts messages sent to the acquirer 108.

The intermediary service 204 includes a customer management module 410, which is configured to retrieve customer information associated with the initial authorization request.

The customer information is accessed from the storage component 402 based on the identifying information contained in the initial authorization request. As discussed above, the identifying information may be an alpha-numeric code, a sixteen digit number similar to a credit card number, or one or more pieces of data that uniquely identifies the customer (e.g., a customer nickname). The stored customer information include an address of a mobile device associated with the customer, information defining one or more payment instruments that may be utilized by the customer to complete a purchase transaction, and a verification code or codes that are associated with the customer, the token, or the payment instruments. If multiple payments instruments are defined, the customer information may also specify a default payment instrument or a set of parameters for determining which payment instrument should be used for a particular transaction.

After the customer management module 410 retrieves the stored customer information, a rules module 412 determines the service's response to the initial authorization request. In some embodiments, the rules module 412 is configured to determine the type of notification to provide to the customer's mobile device and the required level of customer response to the notification in order to confirm the transaction. The rules module 412 may also determine a selected payment instrument to use in the transaction. The type of notification may vary depending on the type and amount of the transaction. For example, the service may require different responses from the customer depending on the total value of the purchase. At a first level (e.g., less than $25), the service may be configured to send a transaction notification to the mobile device without requiring any response from the customer. At a second level (e.g., between $25 and $100), the service may require that the customer reply to the transaction notification with a response that either authorizes or rejects the transaction. At a third level (e.g., above $100), the service may require that the customer reply to the transaction notification with a response that either authorizes or rejects the transaction, as well as provide a verification code with the response. Such rules may be defined by the operator of the service, by merchants that interact with the service, by issuing institutions, or by customers that use the service. While three levels are provided as an example, it will be appreciated that a greater or lesser number of levels may be utilized by the service. If existing service-, merchant-, or customer-defined rules do not already specify the payment instrument to use in the transaction, the rules module 412 will also require that the customer select a payment instrument to use for the transaction in the response. In some embodiments, the rules module 412 includes merchant-defined rules specifying that certain payment instruments are or are not accepted by a particular merchant. For example, a particular merchant may specify a rule indicating that it will not accept payment using American Express and will accept payment using the merchant's gift cards. The rules module 412 can then use this information in selecting the payment instrument or in limiting the number of payment instruments from which a customer can select for a transaction.

In general, the rules module 412 stores a set of rules in the storage component 402. Each rule includes information specifying a customer or group of customers to which the rule applies, a set of conditions that must be met for the rule to be satisfied, and associated actions that are taken when the rule has been satisfied. In the simplest case, a rule identifies a particular customer whose transactions will be subject to the rule. However, a rule may also apply to groups of customers (e.g., for merchant-defined rules), or to all customers (e.g., for service-defined rules). Whether a rule applies to a single customer, to a group of customers, or to all customers may be specified by a code or other mapping to a list of customers that the service maintains. In some embodiments, an individual customer is allowed to create additional rules that apply to the customer's account. For example, the service may allow a customer to create sub-accounts associated with a master account (e.g., a parent creating an account for a child). The customer is then allowed to define an additional set of rules to apply to one or more of the created sub-accounts.

The set of conditions for a rule defines a set of tests that the rules module 412 evaluates each time it evaluates the rule. In order for the rule to be satisfied, all of the conditions specified by the rule must be met. Each condition tests one or more factors. The factors tested may include binary factors (factors having a "true" or "false" value), factors having a numerical value (e.g., numbers falling within a range from 1-100); factors having a range of non-numeric values (e.g., high/medium/low), factors having a textual value (e.g., if a particular string equals a vendor name), or any other value that may be tested. A rule may connect multiple conditions using Boolean connectors (e.g., AND, OR, or NOT operators) in order to determine whether the rule has been satisfied in the applied situation. For example, the service could apply a rule for a customer that utilizes a corporate credit card of the customer for all charges at a particular merchant that occurs during a work week. Such a rule may be phrased as follows:

```
IF (day = Monday, Tuesday, Wednesday, Thursday, or Friday) AND
   (vendor = Office Max) AND (below credit limit? = true)
       THEN (apply <Corporate Card>)
```

The service could also apply a rule to carry out the transaction value test described above, where the service executes a different verification procedure depending whether the transaction value is within a first range (under $25), a second range (between $25 and $100), or a third range (over $100). Such a rule may be phrased as follows:

```
         IF (transaction value <$25.00) THEN (apply
                <Verification Procedure 1>) ELSE
IF ((transaction value >$25.00) AND (transaction value <$100.00)) THEN
               (apply <Verification Procedure 2>) ELSE
     IF (transaction value >$100.00) THEN (apply <Verification
                        Procedure 3>)
```

Other conditions that the service could support are discussed in greater detail below.

Each rule also specifies a set of actions to be executed based on the results of evaluating the conditions. In some embodiments, each rule includes a single action that is executed when the conditions are met and not executed when the conditions are not met. Alternatively, the service may define multiple actions that are selected based on the results of testing the conditions. An action may be simple, such as rejecting the authorization request, or more complicated, such as specifying a verification procedure to be executed before the authorization process continues. The rules module 412 may be configured to execute each action immediately. However, because the service will often test multiple rules for each transaction, the rules module 412 generally tracks the actions to be performed and executes the action(s) after testing every applicable rule.

In some embodiments, a customer, merchant, or the service may specify a time interval during which the rule is active. Each rule with a specified time interval is evaluated only during the time interval and is not evaluated at other times. By allowing a rule to be activated for certain time periods and deactivated for other time periods, a rule may be flexibly tailored to different circumstances. For example, a rule could be tailored by a customer to automatically cover certain payment requests that occur when the customer is on vacation.

One skilled in the art will appreciate that a wide variety of rules can be defined using information that is managed by, or accessible to, the service. In particular, conditions may be defined to evaluate transaction information, customer or account information, or other service information. Examples of factors that may be considered when defining a condition include:

The amount of the transaction,
Whether a token was presented to the merchant for the transaction and conveyed identifying information to the merchant, or whether the customer manually-entered such identifying information,
Whether a card verification code (CVV) was provided as part of the transaction,
The location of the transaction and/or the merchant (e.g., whether the location is within a particular geographical area),
Whether the customer's location differs from the merchant's location (e.g., for Internet purchases),
The time and distance from the last transaction or from a combination of recent transactions,
The customer's historical purchase activity,
Rewards provided to the customer for using a particular payment instrument for the transaction,
The merchant type (e.g., supermarket, electronics store),
The transaction value (e.g., whether the transaction value is within a specified range),
The item type or description (e.g., whether the transaction involves a particular item),
The transaction time,
The payment method, and
Any issuing institution-specific rules.

Similarly, the service may support a variety of actions that can be executed based on the result of evaluating a rule. Examples of actions that may be defined include:

Rejecting or accepting the transaction,
Specifying one or more verification procedures that are executed as part of the transaction (e.g., specifying whether the customer must provide a PIN to verify the transaction),
Selecting one or more payment instruments to be used to complete the transaction or limiting available payment instruments that may be used in the transaction,
Selecting one or more mobile devices to receive a transaction notification,
Selecting a particular shipping method or profile for products that are purchased during the transaction.

The "selecting a payment instrument" action enables a customer to specify that a particular payment instrument should always be used in specified situations, such as for transactions with a particular merchant or transactions that exceed a specified amount. Similarly, the "selecting a mobile device" action allows a customer to specify that multiple notifications should be sent for some transactions (e.g., a message to a first device requesting approval and a message to a second device containing transaction information but not requesting approval). As another example, a parent who has established a sub-account for a child could specify a rule that notifications for low-value transactions are sent to the child's mobile device, while notifications for higher-value transactions are sent to the parent's mobile device.

The service may also maintain a transaction history that tracks purchases for an account over a period of time. The service can use the transaction history information to provide rules that can respond to transactions that deviate from the usual patterns for the account. For example, rules may be defined to detect when purchases are made at a much higher frequency than usual or at locations that are not typical. In response, the rules may direct the service to require additional verification or to reject unusual transactions.

The intermediary service 204 also includes a stored value module 426, which is configured to apply stored value items to a transaction. While the rules module 412 is processing the rules that are relevant to the authorization request, or after the rules module 412 has processed the rules that are relevant to the authorization request, the stored value module 426 determines stored value items that can be applied to the transaction. The service uses identifying information in the authorization request to look up stored value items associated with the customer, such as vouchers and saved coupons. As described above, a customer may receive a voucher as a payment or gift from another customer, as a rebate, or as a refund. Moreover, a customer may have saved coupons that were offered to the customer and saved from earlier transactions. In some cases, the value or other characteristics of these stored coupons may change over time. For example, a coupon may increase or decrease in value as more customers use it. In these cases, the service may request the coupon provider to provide an updated value for the coupon before proceeding with the transaction.

The service also uses transaction information, such as merchant information and/or the identity of transaction items, to determine if any coupons are immediately available for use by the customer. The service may also determine coupons by evaluating the customer's overall purchase history or the customer's purchase history for the individual merchant. Unlike vouchers and stored coupons, immediately-available coupons are not initially associated with the customer's account. Instead, the coupons are automatically identified by the service at the time of the corresponding authorization requests. Coupons may be provided to the intermediary service 204 by entities such as merchants or manufacturers. For example, a manufacturer might partner with the intermediary service to provide a coupon to customers who purchase multiple units of the manufacturer's products within a specified period of time. The intermediary service 204 can then provide the coupon regardless of where the items were purchased by the customer. Similarly, a merchant might partner with the intermediary service 204 to provide coupons or vouchers to frequent customers. An advantage of using the intermediary service to tender coupons or vouchers to customers is that a merchant can provide benefits to frequent customers without having to build its own infrastructure to track customer habits. In addition, because the service aggregates transactions from multiple merchants, the service has greater knowledge of customer habits than any individual merchant. The service also enables manufacturers to reward customers for purchases that occur across several merchants.

In some embodiments, the intermediary service automatically applies all available stored value items to the transaction. The service may then provide a transaction notification to inform the customer which items were applied. Alternatively, the stored value module 426 may transmit a list of some or all available stored value items to the customer's mobile device in a transaction notification. The service may then prompt the customer to select which stored value items should be applied to the notified transaction. Newly-generated stored value items that are not applied to the notified transaction, such as auto-generated coupons that the customer does not use immediately, may be automatically stored by the service (if allowed by the issuing merchant or manufacturer) in the customer's account for subsequent use by the customer. Items that were already stored in the customer's account (e.g., vouchers or stored coupons) remain in the customer's account without any additional customer action. A stored value item is removed from a customer's account if, for example, the stored value item has expired, if the stored value item is completely utilized (e.g., if no value remains, if a multi-use stored value item is exhausted, etc.), or if the customer expressly removes the stored value item. One skilled in the art will appreciate that the intermediary service may provide a summary web page to enable the customer to view and manage stored value items that have been saved to the customer's account.

The intermediary service also includes an advertising module 428, which is configured to provide targeted advertisements to the customer's mobile device. The advertising module 428 evaluates the information in the authorization request, including the merchant and the associated products and services, and the customer's purchase history to determine if the service should provide one or more advertisements to the customer. As with coupons, the intermediary service 204 may partner with merchants or manufacturers to provide advertisements based on particular purchases or groups of purchases. The service may also provide advertisements based on the merchant at which the purchase is being made. Because the service has detailed information about the transaction and the customer's overall purchase history, the advertising module 428 can target the advertisements to ensure that they are relevant to the customer. For example, when a customer purchases a mobile device, the service might automatically provide an advertisement for cases or other accessories for use with the mobile device.

The intermediary service 204 also includes a mobile device communication module 414, which is configured to communicate with mobile devices 206. The mobile device communication module 414 generates and transmits a transaction notification message in response to the initial authorization request. The transaction notification message includes transaction information, such as the amount of the transaction and the name or location of the merchant requesting the authorization. The transaction notification message may also specify a payment instrument to use for the transaction or specify a list of payment instruments and request a selection from the list. The transaction notification may be sent to the mobile device in a variety of messaging formats. In some embodiments, the transaction notification is transmitted to mobile devices 206 via an asynchronous XMPP message. To allow a mobile device to receive an XMPP-encoded message, the mobile device includes a mobile device client 418 that runs in the background of the device. The mobile device client 418 may be pre-installed on the mobile device 206, or may be downloaded to the mobile device 206 when a customer opens an account with the intermediary service. In some embodiments, the mobile device client 418 operates continuously, since it is impossible to predict when a customer might attempt to make a purchase. In these embodiments, the mobile device 206 remains in a state where it always can receive a transaction notification message. However, the mobile device 206 will often operate in a standby or low-power mode in order to preserve battery power. In these embodiments, the mobile device client 418 cannot be operated continuously. Instead, the intermediary service 204 sends a wake-up message to the mobile device client 418 before sending a transaction notification message. The wake-up message may be transmitted on a different messaging channel, such as via a binary SMS message or via a WAP push message or other remote push service.

Once the service has determined that the transaction has been confirmed by the customer, an issuing institution communication module 416 generates an information request based on the received initial authorization request, the customer information, and the information received from the mobile device 206 (if any). In particular, the information request may include the desired payment instrument information, the transaction amount, transaction items, and information about the point of purchase. The issuing institution communication module 414 encrypts the request using the encryption module 408 and transmits the message to the issuing institution 112 where the information request is processed.

After the information request is processed by the issuing institution 112, the issuing institution communication module 414 receives an account information message from the issuing institution that includes account information associated with the selected payment instrument. The account information may include, for example, the credit card number and expiration date of a credit card selected from the set of available payment instruments. After receiving the account information, the intermediary service 204 forwards the information to the acquirer 106. In some embodiments, the account information is encrypted by the issuing institution 112 such that it can only be decrypted by the acquirer 106 (i.e., the account information cannot be interpreted by the intermediary service 204). Alternatively, the account information may be decrypted by the intermediary service 204 and re-encrypted for transmission to the acquirer 106. The acquirer 106 then proceeds according to the process discussed above in FIGS. 2A-C.

As previously stated, the acquirer 108 may also send information from the authorization message and/or other transaction information to the intermediary service 204. The mobile device communication module 416 then generates a receipt message and transmits the receipt message to the mobile device 206 using the methods discussed above. In some embodiments, the mobile device client 418 provides a "dispute" button that may be selected by the customer to indicate that the transaction was erroneous or fraudulent such that the issuing institution 110 should initiate dispute proceedings.

The intermediary service 204 also includes a customer communication module 420, which is configured to communicate with a customer 422. The customer communication module 420 works with a request evaluation module 424 to execute requests received from the customer 422. In particular, the customer communication module 420 receives account setup and configuration information and enables the customer 422 to selectively change account status. The customer 422 may also communicate with the customer communication module 420 to define customer-specified rules, as discussed above. Customers 422 may send information to the customer communication module 420 using a web page or a dedicated application on a PC or mobile device.

To change the status of an account a customer 422 sends information to the customer communication module 420 to notify the intermediary service 204 that a selected account should be activated or deactivated. The information may also specify a time that the change in status should be made or a time interval over which the change should apply. For example, a customer who is planning a vacation for a week may specify that a particular account should be deactivated during that vacation but should be reactivated at the end of that time. In response, the request evaluation 424 determines if activation and deactivation are to be managed by the issuing institution 110 and, if necessary, provides an indication of any status change (or current status) to the issuing institution 110. The process of changing account status is discussed in greater detail below with reference to FIGS. 10A and 10B.

Figure 6A:
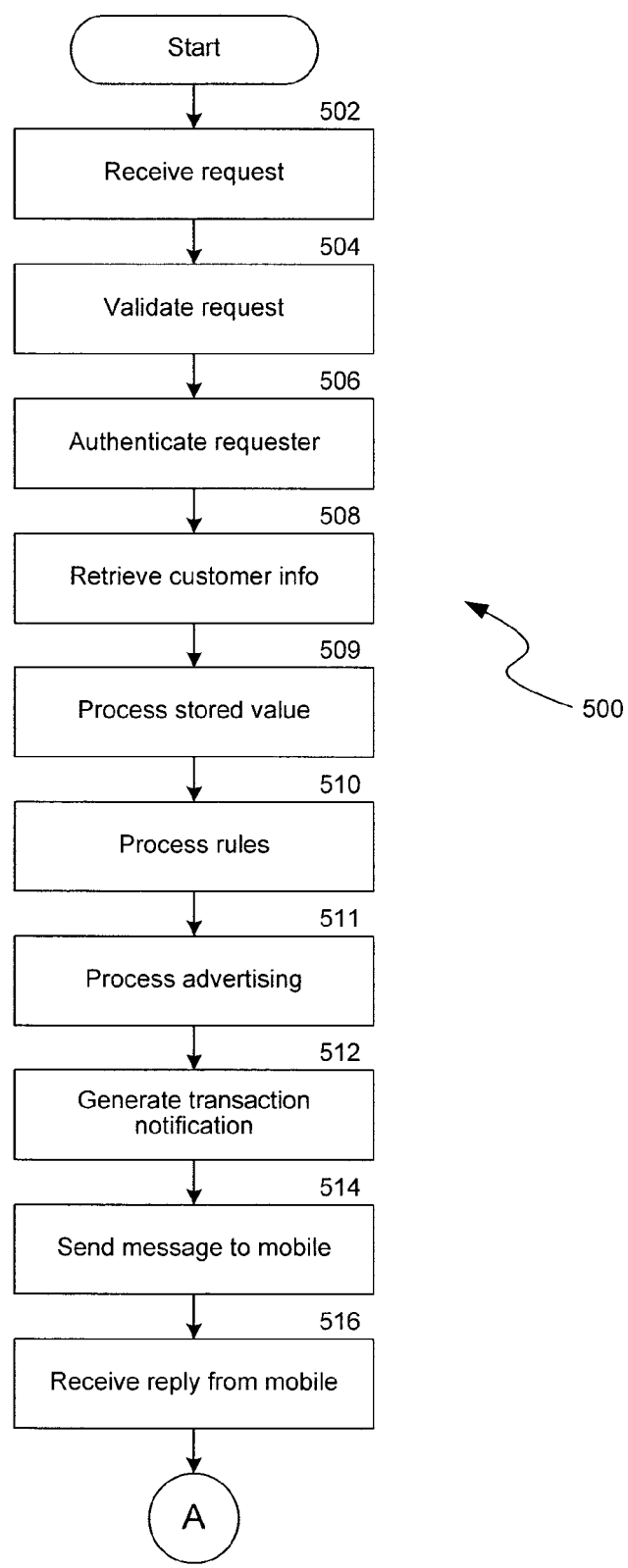
FIGS. 6A and 6B are a flow chart of a process for processing financial transaction data executed by an intermediary service.
Figure 6B:
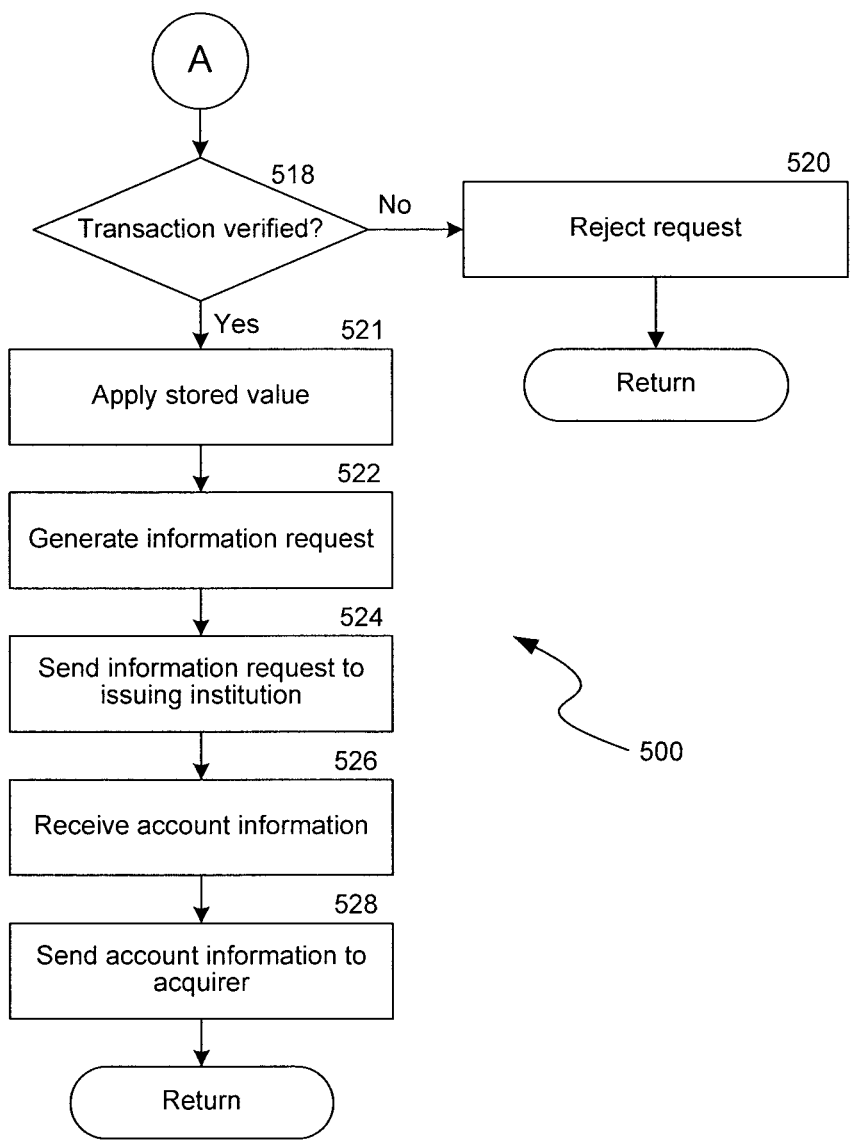

FIGS. 6A and 6B illustrate a flowchart of a process 500 for processing financial transaction data executed by the intermediary service 204. Processing begins in block 502, where the intermediary service 204 receives an initial authorization request from an acquirer 106. As discussed above, the initial authorization request includes unique identifying information, transaction information (e.g., the amount of the transaction, the transaction identifier, etc.), and point of purchase information. The intermediary service 204 may also receive additional transaction information directly from the point of purchase 106 through a communication channel that bypasses the acquirer. The separate communication channel may be used to send data that cannot be sent through, or is not typically sent through, the acquirer 108. For example, stock-keeping units (SKU) for products purchased in the transaction are not sent through the acquirer since such information does not conform to reporting guidelines enforced by the acquirer. The intermediary service may therefore receive the SKUs via a separate communication from the merchant. As another example, URLs identifying a product purchased from a website are not sent through the acquirer due to a lack of specified fields for transmitting URLs. As a result, the intermediary service may receive URLs directly from the merchant via an alternate communication channel. Supplemental information about the transaction that is received by the intermediary service may be used to process the initial authorization request as described in more detail herein. The merchant may also provide the supplemental information to the intermediary service at a later time. In these cases, the intermediary service may append the supplemental information to stored transaction information.

After receiving an initial authorization request, processing proceeds to block 504, where the service validates the request according to the methods discussed above. The validation step may include, for example, verifying that the message is in a proper format and verifying that the message includes the essential data for handling the request. Processing then proceeds to block 506, where the service authenticates the requester. As discussed above, the authorization request may include a digital signature provided by the acquirer that can be cryptographically verified. Alternatively, the service may authenticate the acquirer by using a shared cryptographic key to decrypt a portion of the data in the message.

The service then proceeds to block 508, where it retrieves customer information corresponding to the information in the authorization request. Retrieving customer information may be executed by using some or all of the identifying information in the request as an index into a customer information database. As discussed above, the stored customer information may include information defining one or more payment instruments that the customer has indicated can be used to pay for a transaction. The customer information also includes an address of a mobile device, such as the mobile device's telephone number or IP address. The customer information is provided by a customer during an initial registration process in which the customer registers with the service and enters the appropriate information. Alternatively, the customer information may be provided by, for example, a financial institution that offers the intermediary service as an added benefit to a financial instrument provided to the customer.

After retrieving the stored customer information, processing proceeds to block 509, where the stored value module 426 identifies and potentially utilizes any stored value that can be applied to the transaction. This step is discussed in greater detail below with reference to FIG. 6E. Processing then proceeds to block 510, where the service processes the rules specified by the rules module 412. The process executed in this step is discussed in greater detail below with reference to FIG. 6D. The service then proceeds to block 511, where the advertising module 428 determines any relevant advertisements based on the authorization request or the customer's information.

In some cases, the rules module 412 determines that the service should carry out a verification procedure that includes a transaction notification message. Similarly, the stored value module 426 may determine that the service should notify the customer of some or all of the available stored value items. The advertising module 428 may also generate one or more advertisements that should be sent to the customer. In these cases, processing proceeds to block 512, where the service generates a transaction notification message. The transaction notification message includes at least a minimum amount of information to enable the customer to confirm the transaction. Thus, the transaction notification message may include the transaction time, the transaction amount, the point of purchase, and/or the purchase location. The transaction notification message may also specify a payment instrument that will be used for the transaction, or a list of payment instruments that may be used and require that the customer select from the list. In addition, the transaction notification message specifies a required response from the customer, such as an authorization/denial of the transaction or the submission of a verification code. The transaction notification message may also include a listing of available stored value items and request that the customer select items that should be applied to the transaction. Available advertisements may be sent in a separate message or included in the transaction notification message.

After generating the transaction notification message, the service proceeds to block 514, where it sends the message to the mobile device 206. Processing then proceeds to block 516, where the service receives a reply from the mobile device 206. As discussed above, this step is not executed if the transaction notification message did not require a response from the customer. The service then proceeds to decision block 518 in FIG. 6B, where it uses the reply message to determine whether the transaction was verified by the customer. In some cases, the service may do so by detecting a verification indicator in the reply message, which could simply be a single bit or a "yes" or "no" received from the mobile device 206. Alternatively, if the reply message includes a verification code, the service compares the received verification code to a verification code in the stored customer information. In some embodiments, the verification code is encrypted by the mobile device 206 using a one-way hash function. The intermediary service then verifies the transaction by comparing the received hash value to a value generated by applying the same one-way hash function to the stored verification code. If the reply message indicates that the customer has denied the request or the customer's verification code does not match the stored verification code, processing proceeds to block 520, where the service rejects the authorization request. At this step, the service may transmit a rejection message to the acquirer to notify it of the rejected request.

If the transaction is verified by the customer, processing proceeds to block 521, where the service processes the stored value portion of the reply. The reply includes a specified action for each stored value item that was included in the transaction notification. For example, the specified action may direct the service to retain the stored value item in the customer's account for later use. The specified action may also direct the service to apply the stored value to the transaction. To apply the stored value, the service reduces the transaction amount by the stored value item's associated value. If the associated value is expressed as a currency amount, the service reduces the transaction amount by the currency amount. If the associated value is expressed in non-currency units, the service converts the non-currency units to a corresponding currency value at a conversion rate and applies the converted value to reduce the transaction amount. In some embodiments, the service converts the non-currency units using a pre-determined conversion rate (e.g., 80 points per dollar). In other embodiments, the conversion rate is determined based on characteristics of the transaction, such as the transaction time or the merchant. For example, one merchant may offer to redeem non-currency units at one rate (e.g. 10 points to the dollar) while another merchant may offer to redeem non-currency units at another rate (e.g., 15 points to the dollar). As another example, the conversion rate may become less favorable over time so that the points become less valuable the longer the customer stores points. Such a variable conversion rate encourages customers to redeem points in a timely manner. In these embodiments, the conversion rate may be dynamically determined at the time of the transaction (e.g., by querying the coupon issuer) or based on a pre-defined schedule that specifies conversion rates based on particular characteristics. If the associated value is expressed as a percentage, the service converts the percentage to a currency amount by multiplying the percentage by the applicable portion of the transaction amount. The service then reduces the transaction amount based on the converted currency amount. The service can then provide a new transaction amount to the issuer based on the remaining amount of the transaction. The service also modifies the stored value item based on its use in the transaction. For example, the service may reduce the currency amount of a voucher based on the amount that was applied to the transaction. Similarly, the service may reduce the number of remaining uses available for a coupon. If a stored coupon only had one use remaining, the service may delete the coupon from the customer's account following the last use. If customer verification is not required, the service may apply the stored value earlier in the process, such as during the initial processing of stored value in block 510.

Processing then proceeds to block 522, where the service generates an information request using information from the initial authorization request, the customer information, and/or the customer's reply message. The information request may include identifying information from the initial authorization request or the customer information. After generating the information request in block 522, processing proceeds to block 524, where the service sends the message to the appropriate issuing institution.

Processing then proceeds to block 526, where the service receives an account information message from the issuing institution in response to the information request. As discussed above, the account information includes information associated with the selected payment instrument that can be used to authorize payment. The account information may be encrypted such that it can only be accessed by the acquirer 108. After receiving the account information, processing proceeds to block 528, where the intermediary service sends the account information and the modified transaction amount to the acquirer 108, which can then generate the modified authorization request.

Figure 6C:
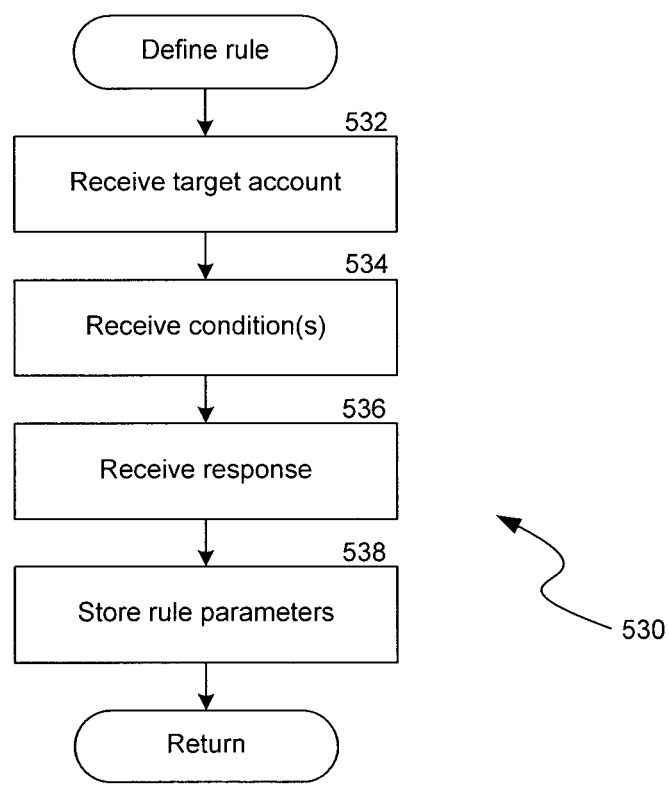
FIG. 6C is a flow chart of a process for defining rules to be executed by the intermediary service.

FIG. 6C is a flow chart of a process 530 for defining a rule to be executed by the intermediary service. The service executes the process 530 for each rule to be defined. The process 530 may be executed by components of the intermediary service 204 (e.g., the rules module 412 and the customer communication module 420 of FIG. 5) or by a separate management component that is configured to generate rules and store the rules in the storage component 402 (FIG. 5). Rules information may be specified remotely (e.g., by a customer) connecting through a network connection. Processing begins at block 532, where the service receives an indication of whether the rule applies to an individual account, to a group of accounts, or to all accounts. After the service receives the applicable account information, processing proceeds to block 534, where the service receives information specifying one or more conditions for the rule being defined. The service then proceeds to block 536, where it receives information specifying one or more actions associated with the rule. The information specifies the actions and also associates the action with a particular result of the conditions. For example, the rule may specify a first action to be performed if the conditions are met (i.e., the conditions return "true" when evaluated) and a second action to be performed if the conditions are not met. Processing then proceeds to block 538, where the service generates a rule based on the received information and stores the rule in the storage component 402. In some embodiments, the service may also receive and store information specifying an active time interval for the rule.

Figure 6D:
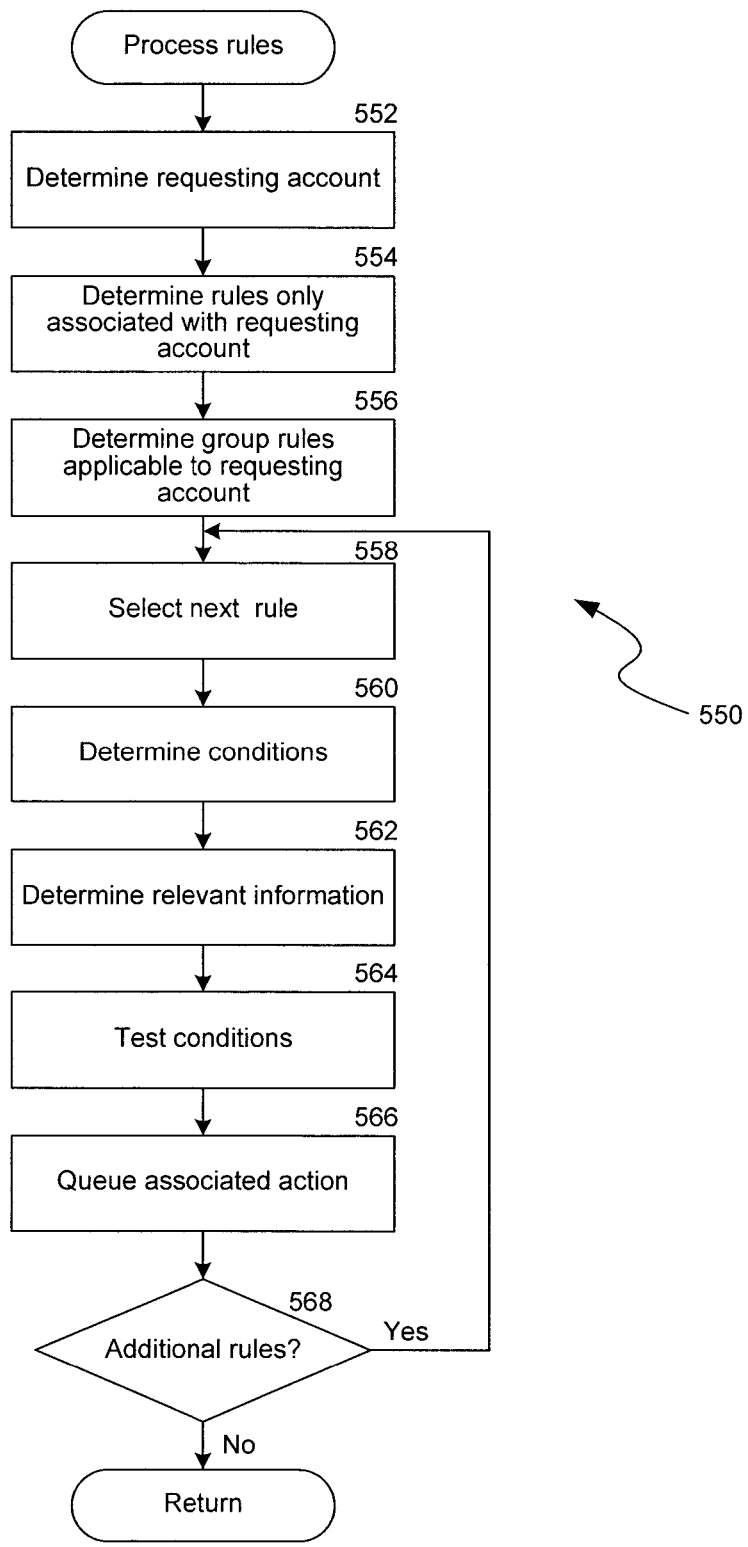
FIG. 6D is a flow chart of a process for processing rules by the intermediary service.

FIG. 6D is a flow chart of a process 550 for processing rules by the intermediary service. The service executes the process 550 during the processing of block 509 of FIG. 6A. Thus, the process 550 is executed each time the service receives a new authorization request. Processing begins at block 552, where the service uses identifying information in the authorization request to determine which account is requesting authorization. Processing then proceeds to block 554, where the service determines rules associated with the requesting account. As discussed above, each rule is associated with an account or a set of accounts. In block 554, the service determines rules that are specifically associated with the requesting account. Processing then proceeds to block 556, where the service determines rules that apply to any group that includes the requesting account, including rules that are configured to apply to every account. The service may also filter the rules to exclude those that are not active at the current time.

Once the service has determined the full set of applicable rules, processing proceeds to block 558, where the service selects the first rule from the set of applicable rules. As illustrated in FIG. 6D, the service processes each rule in a loop until all rules have been processed. One skilled in the art will appreciate the service may use other methods to process the applicable rules, such as processing the rules in parallel using multiple threads or processes.

After the service selects the first rule to apply, processing proceeds to block 560, where the service determines the conditions specified by the selected rule. Processing then proceeds to block 562, where the service determines the relevant information for evaluating conditions for the selected rule. The relevant information depends on the particular conditions surrounding the authorization request, and may be derived from the authorization request, from stored data such as the stored customer information, or from data maintained or accessible by the service, such as the current time. Processing then proceeds to block 564, where the service evaluates the conditions based on the relevant information. As previously discussed, the conditions may be connected based on Boolean operators, such as AND or OR operations.

Processing then proceeds to block 566, where the service determines a corresponding action based on the result of the evaluation and queues the corresponding action for execution. As discussed above, actions are specified when the rule is defined and correspond to particular results reached by evaluation of the rule. Actions may direct the service to affirm the authorization request, to use a particular payment instrument of combination of payment instruments in response to the authorization request, to reject the authorization request, or to execute a pre-determined verification procedure before affirming the authorization request. Queuing actions allows the service to avoid executing redundant actions in response to different rules. For example, if evaluation of a first rule indicates that the authorization request should be rejected and evaluation of a second rule indicates that a particular verification procedure should be executed, only the first action should be executed, because it would be pointless to do the verification procedure for a rejected transaction. By queuing actions, the service can look at all actions before attempting to execute any action. After the action is queued, processing proceeds to decision block 568, where the service determines if there are additional rules to be processed. If there are additional rules, processing returns to block 558, where the service selects the next rule and repeats the evaluation process. When no rules remain to be evaluated, the process ends.

Figure 10A:
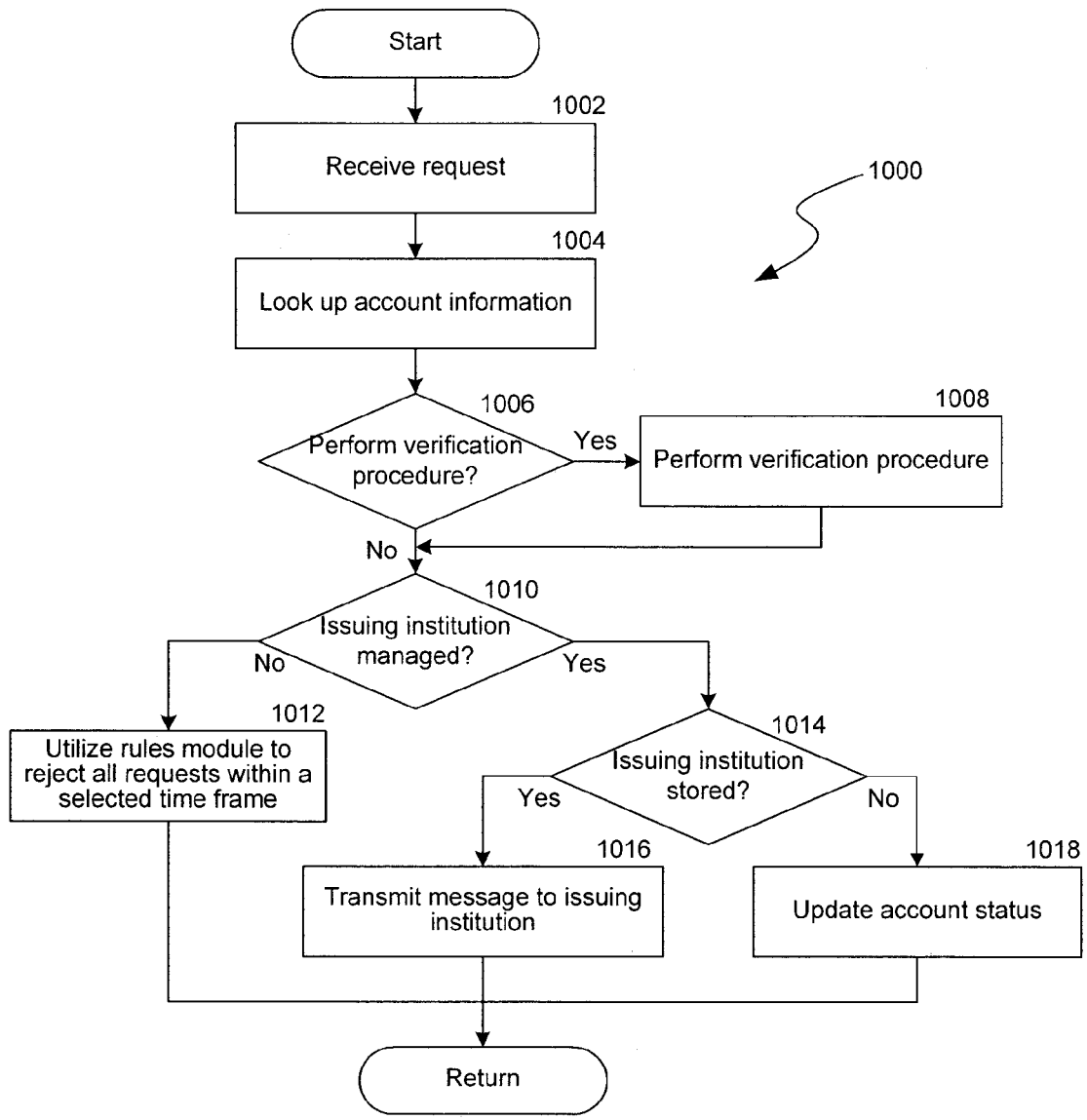
FIG. 10A is a flowchart of a process for selectively activating or deactivating an account through the intermediary service.

The use of rules allows a customer, merchant, or the service to specify how authorization requests are processed for particular accounts. In addition to having rules to process such requests, in some circumstances it is beneficial to allow the customer or service greater control over the status of the account. That is, it would be beneficial to allow the customer or the service to easily turn an account on or off on a temporary basis. Such a feature would allow a customer, for example, to disable an account when desirable (e.g., when the customer is on vacation and will not be using one of the customer's accounts). FIG. 10A is a flowchart of a process 1000 for controlling the status of an account through the intermediary service. The steps of the process 1000 may be implemented using various components of the intermediary service 204, such as the customer communication module 420 and the request evaluation module 424. Prior to executing the process 100, the intermediary service 204 will have registered a customer's account. In the registration process, the customer communication module 420 receives account information, such as an account identifier and information identifying the issuing institution, from the customer. The intermediary service 204 may also have also verified the account and set up a relationship between the intermediary service 204 and the issuing institution 110, if one was not previously established.

For any registered account, processing begins at block 1002, where the service receives a request to change the account's status. The request may be received at any time after the account has been registered. The request includes information such as the account identifier, the requested change to the account status (e.g., to activate or deactivate the account), and, optionally, an applicable time interval for which the account status should be changed. After receiving the request, processing proceeds to block 1004, where the service uses the account identifier, or other identifying information, to retrieve account information for the account from the storage component 402. The retrieved information includes the identity of the issuing institution 110 and may also include information for verifying the authenticity of the status change, such as the customer's mobile telephone number. Processing then proceeds to decision block 1006, where the service determines whether a verification procedure should be performed to confirm the account status change. Whether the service performs a verification procedure configured by the customer and/or the service. If a verification procedure is to be performed, processing continues to a block 1008. At block 1008, the service performs a verification procedure before continuing with the status change process. The verification procedure may include, for example, sending a message to the customer's mobile device and receiving confirmation from the customer via the mobile device. If the customer does not confirm the authenticity of the request to change the status of the account, the service rejects the status change. The customer may be required to confirm the authenticity by, for example, affirmatively responding to the verification procedure with an appropriate verification code. Other previously-described techniques for verifying a transaction request may similarly be applied to the verification of the status change.

If the verification procedure is successful, or if it is not performed, processing proceeds to decision block 1010, where the service determines if activation and deactivation will be managed by the issuing institution 110. The determination of whether the activation/deactivation is managed by the issuing institution may be based on an agreement between the issuing institution 110 and the intermediary service 204 or based on customer-specified settings. If status will not be managed by the issuing institution, processing proceeds to block 1012, where the service uses the rules module 412 to change the account status. In particular, if the request directs the service to deactivate the account for a selected time period, the service defines a rule to reject authorization requests during the specified time period. Similarly, if the request later directs the service to activate the account, the service controls the rules module 412 to remove or modify previously-applied rules that rejected authorization requests during a specified time period. The modification of rules by the rules module is carried out according to the process discussed above with reference to FIGS. 6C and 6D.

If the service determines that status will be managed by the issuing institution 110, processing proceeds to decision block 1014 where the service determines whether the account status information will be stored locally. As above, this may be determined by the customer or may be based on an agreement between the issuing institution 110 and the intermediary service 204. An advantage of having the intermediary service 204 store status information is the issuing institution 110 can avoid incurring the cost of developing infrastructure to receive and store the status information. Instead, as discussed below with reference to FIG. 10B, the issuing institution 110 can query the intermediary service 204 for status information as needed, such as in response to an authorization request. If the service determines that the account status information will be stored by the issuing institution 110, processing proceeds to block 1016, where the service transmits a message to the issuing institution 110. The message notifies the issuing institution 110 of the new status for the specified account and may be encrypted using the methods described above for handling authorization requests. If the service determines that the status will not be stored by the issuing institution, processing proceeds to block 1018, where the service stores the account status in the storage component 402. In some embodiments, the service may allow the customer to specify a start time for the change in account status. In these embodiments, the service only notifies the issuing institution 110 of any change in account status after the specified start time has passed.

Account status may be changed at a later time using a similar process. In one embodiment, the customer's request may specify a time interval for a particular status change. At the beginning of the interval, the intermediary service 204 provides an indication of the status change (e.g., by sending a message to the issuing institution) and at the end of the interval the service provides a second indication to return the account to its original status. Any request to change account status may specify a time in the future to implement a particular status change, rather than making the change immediately. When the specified time is reached, the intermediary service makes the requested change or initiates the requested change by transmitting appropriate messages to the issuing institution. Alternatively, the issuing institution 110 may manage the timing itself. In this case, the intermediary service 204 provides the end time to the issuing institution 110 at the same time that it notifies the issuing institution 110 of the first status change. The issuing institution 110 then reverts to the original account status after the specified end time has passed.

If an attempt is made to use a deactivated account, the service may be configured to automatically notify the customer of, or query the customer about, the attempt. For example, the intermediary service 204 may send a notification message providing transaction information when an attempt is made to utilize a deactivated account. The notification message allows the customer to investigate the source of transaction and to reassess whether the account should remain deactivated. The notification message may allow the customer to reactivate the account from the customer's mobile device. Reactivation of the account could be done using a verification procedure similar to the previously-described procedure. That is, the service sends a notification message to the customer and allows the customer to reactivate the account by sending an appropriate authorization message to the service. In some embodiments, the service may be configured to require a verification code to reactivate the account.

Figure 10B:
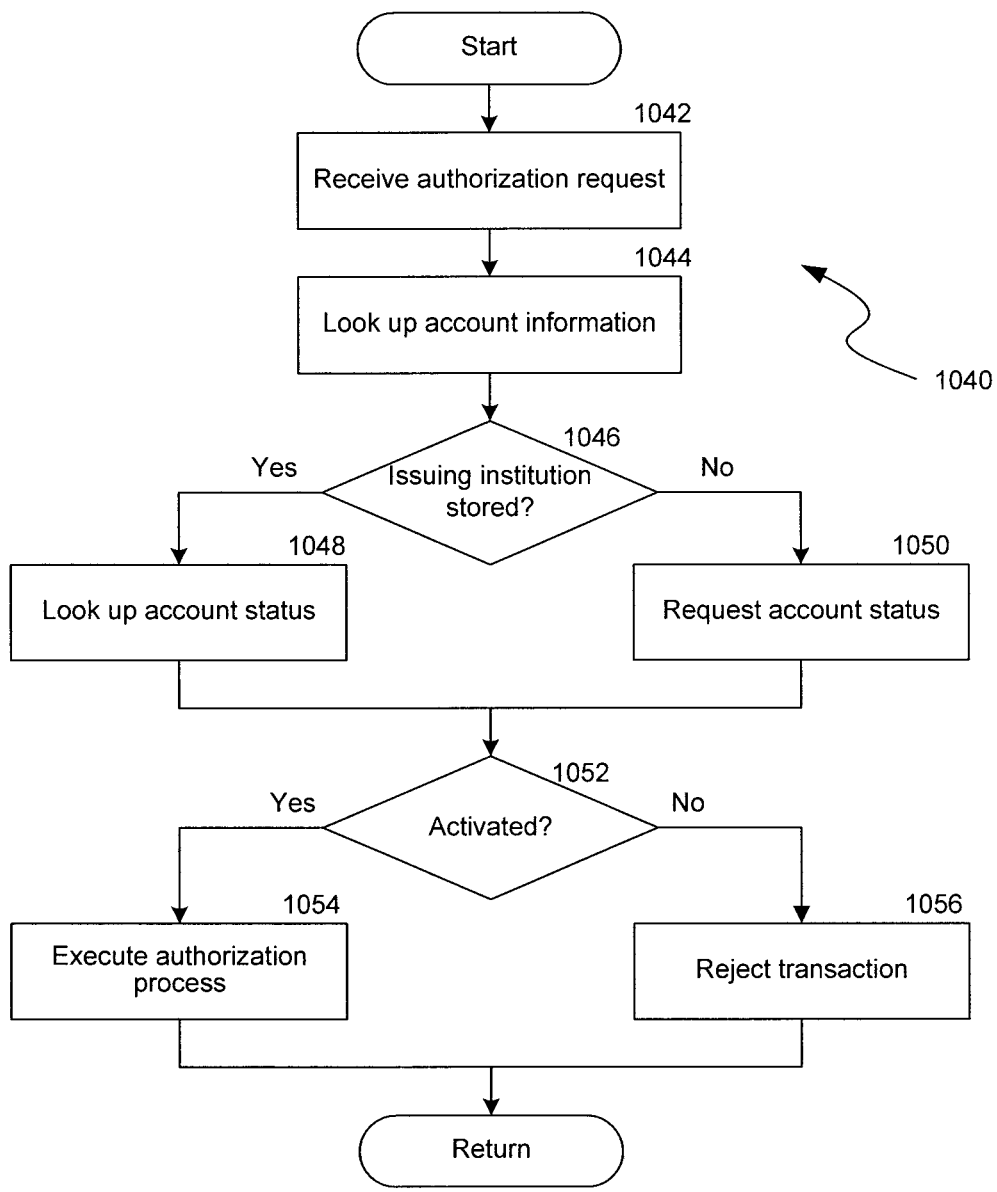
FIG. 10B is a flowchart of a process for handling an authorization request by an issuing institution.

When the intermediary service allows customers to manage the status of their account, the issuing institution and the intermediary service coordinate to ensure that the issuing institution properly allows or rejects authorization requests based on the account status. FIG. 10B is a flowchart of a process 1040 for handling an authorization request by the issuing institution 110. Processing begins at block 1042, where the issuing institution 110 receives an authorization request from the payment association 112.

Processing then proceeds to block 1044, where the issuing institution 110 looks up account information associated with the authorization request. Processing then proceeds to decision block 1046, where the issuing institution uses the account information to determine whether account status is stored by the issuing institution 110 or the intermediary service 204. If the status is stored by the issuing institution 110, processing proceeds to block 1048, where the institution looks up the current account status using an account database. Otherwise, processing proceeds to block 1050, where the institution communicates with the intermediary service 204 to request account status information.

Once the issuing institution 110 has received the current status for the account, processing proceeds to decision block 1052, where the issuing institution evaluates the current status to determine if the account is activated. If the account is activated, processing proceeds to block 1054, where the issuing institution handles the authorization request using standard credit procedures. If the account is not activated, processing proceeds to block 1056, where the institution rejects the authorization request. After the request has been handled, the process ends.

Figure 6E:
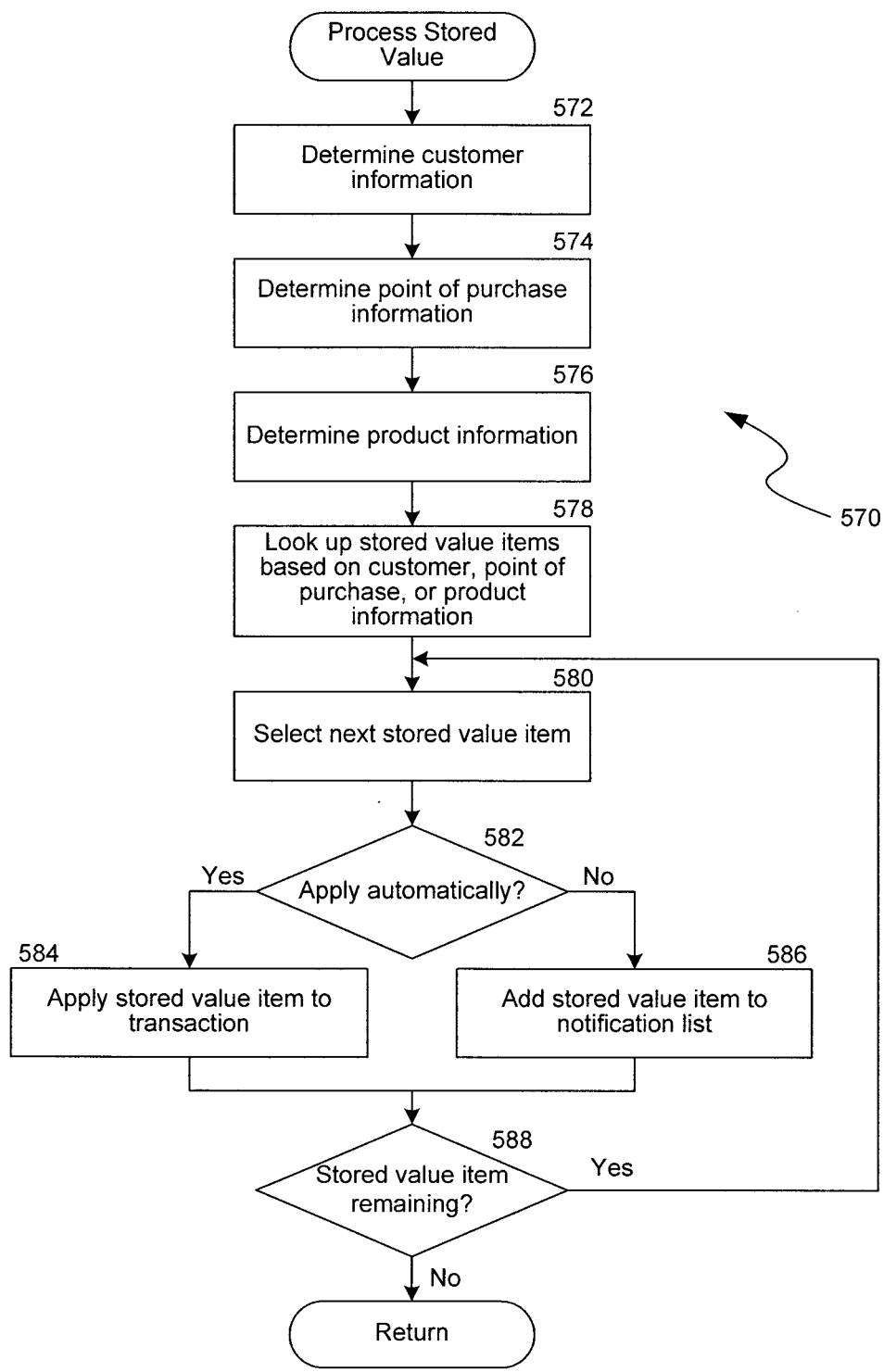
FIG. 6E is a flow chart of a process for processing stored value by the intermediary service.

FIG. 6E is a flowchart of a process 570 for processing stored value by the intermediary service 204. The service executes the process 570 during the processing of block 510 of FIG. 6A. Processing begins at block 572, where the service retrieves the customer information associated with the identifying information in the authorization request. At a block 574, the service retrieves the merchant information associated with the merchant identifier in the authorization request. At a block 576, the service uses the listing of transaction items in the authorization request to determine the products purchased during the transaction. The service may also use a product database to retrieve additional details about the products, such as product type and manufacturer.

At a block 578, the service retrieves applicable stored value items based on the information determined in blocks 572-576. As previously discussed, some stored value items are linked with the customer (i.e., stored in associated with a customer's account), such as vouchers and saved coupons. Stored value items may also be generated based on aspects of the current transaction or the customer's transaction history. For example, the service may generate coupons for transactions with a particular merchant or for transactions that include particular products. The service may also use a customer's transaction history to determine applicable coupons. Coupons based on a transaction history may be used to reward loyal customers, such as customers that buy from a particular merchant, or buy a particular product more than a specified number of times over a specified time period. The service may also provide coupons for products that relate to a purchased item, such as accessories for a mobile device. The service may also provide coupons for a particular product when the customer purchases similar products from other manufacturers. The service may also generated coupons based on the transaction time; for example, the service may be configured to generate coupons for a merchant or manufacturer during a specified time period coinciding with a sale.

The intermediary service may be configured to handle the stored value items in various ways. For example, the service may be configured to handle all items identically, such as by automatically applying each item to the transaction or automatically requiring customer verification before applying any items to the transaction. However, the service may also allow a customer to define rules to specify how individual stored value items should be applied. Thus, the process 570 includes a loop that evaluates each stored value item separately. One skilled in the art will appreciate that the loop can be collapsed into a single iteration if the service is configured to treat all stored value items identically.

The loop begins at block 580, where the service selects the next stored value item on the list. Processing then proceeds to decision block 582, where the service determines whether the stored value item should be applied automatically. In block 582, the service evaluates a set of rules to determine whether the service should request verification before applying the selected stored value item. The evaluated rules may use factors similar to those discussed above with reference to the rules module. For example, the customer may specify that vouchers should be applied automatically, while coupons should be applied only after the customer has approved them by sending a response to a transaction notification. The customer may also specify that coupons for particular products or particular merchants should be applied automatically, while other coupons require verification before being applied.

If the service determines that the stored value item is to be applied automatically, processing proceeds to block 584, where the service applies the stored value item to the transaction. As discussed above, the service may do so by reducing the transaction amount by the stored value item's currency amount. Thus, if the transaction amount is $35 and the service applies a $5 coupon, the new transaction amount is $30. For stored value items denominated in non-currency units, the service also converts the value from non-currency units to a corresponding currency amount before applying the value to the transaction. If the stored value item's associated value is expressed as a percentage of the transaction amount, the service first converts the percentage to a currency amount before applying the currency amount. If the service determines that the item should not be applied automatically, processing proceeds to block 586, where the service adds the stored value item to a list of items that are to be included in the transaction notification. The list is used in block 512 of FIG. 6A, where the service generates the transaction notification. The service then applies selected stored value items in block 521 of FIG. 6B after the customer responds to the transaction notification. After the service has handled the selected item, processing proceeds to decision block 588, where the service determines if there are additional stored value items to be processed. If items remain, the service returns to block 580 to process the next item. Otherwise, the process ends.

Figure 7:
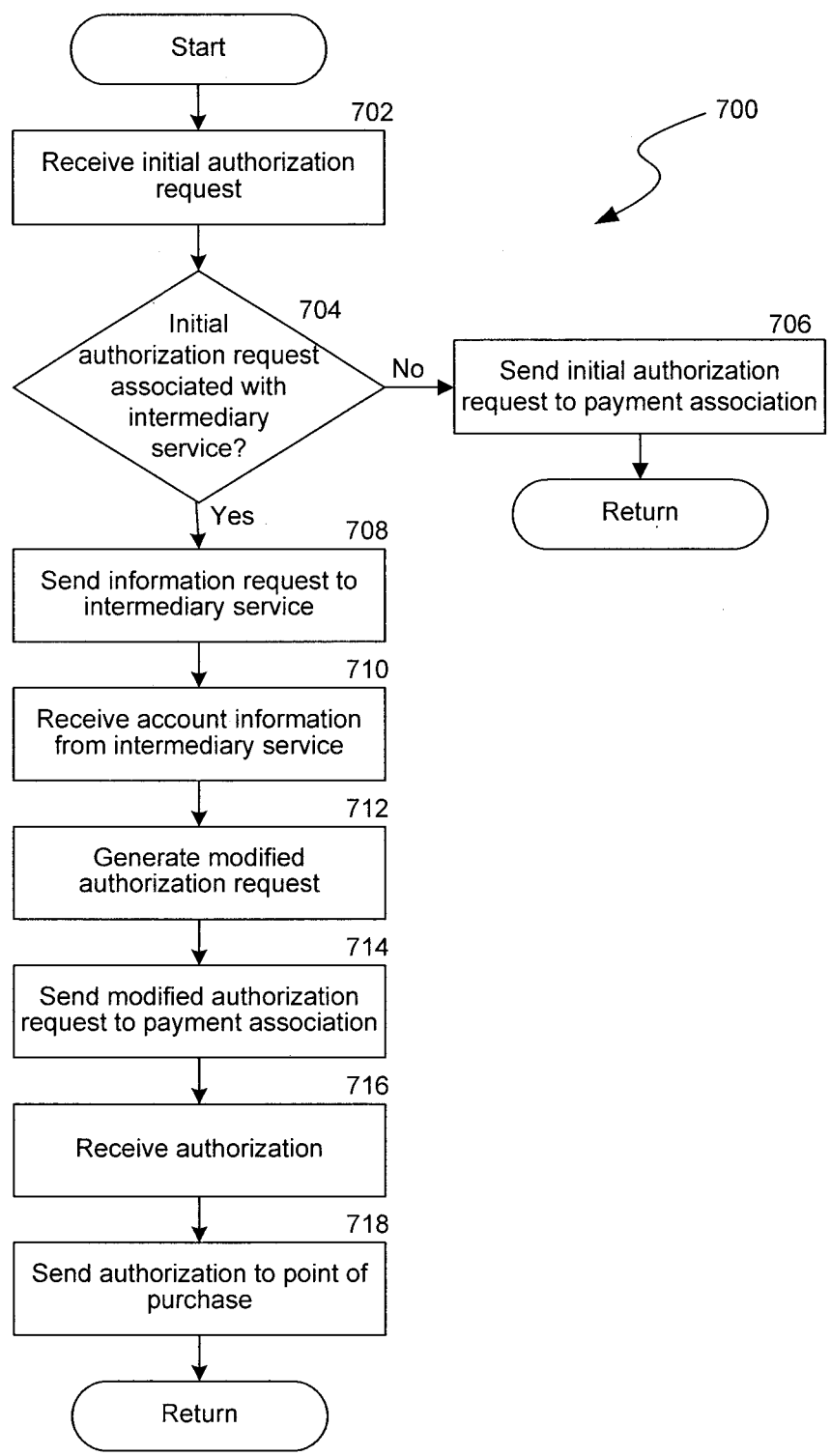
FIG. 7 is a flowchart of a process for processing financial transaction data executed by an acquirer.

FIG. 7 is a flowchart of a process 700 for processing financial transaction data executed by an acquirer 108. The process 700 is executed by the acquirer 108 in conjunction with the process 500 executed by the intermediary service of FIGS. 6A and 6B. Processing begins at block 702, where the acquirer 108 receives an initial authorization request from the point of purchase 106. At a decision block 704, the acquirer determines whether the initial authorization request should be routed to the intermediary service 204 based on the identifying information contained in the initial authorization request. The determination may include, for example, assessing whether an identifying number contained in the initial authorization request falls within a range of identifying numbers or has a particular prefix associated with the intermediary service 204. If the initial authorization request is not associated with the intermediary service, at a block 706 the acquirer forwards the initial authorization request to the payment association 112 for processing in accordance with traditional processes as described in FIG. 1. If, however, the identifying information contained in the initial authorization request indicates that the initial authorization request is associated with the intermediary service, processing continues to block 708. At block 708, the acquirer 108 sends at least part of the data from the initial authorization request to the intermediary service 204.

Processing then proceeds to block 710, where the acquirer 108 receives account information from the intermediary service 204. The intermediary service 204 determines the account information using the process 500 of FIGS. 6A and 6B. The received account information may be received in encrypted or unencrypted form. If encrypted by the issuing institution or the intermediary service, the acquirer 108 may decrypt the account information using a locally-stored encryption key. After receiving the account information, processing proceeds to block 712, where the acquirer 108 generates a modified authorization request based on the initial authorization request and the received account information. As discussed above, the acquirer 108 may generate the modified authorization request by replacing identifying information contained in the original request with the received account information. The following is an example of an initial authorization request such as might be received from a point of purchase:

---
Transaction Identifier
Identifying Information
Initial Track 2 Data (optional)
Industry Standard Code
Merchant Information
Transaction Amount
Transaction Items

---

The identifying information results in the initial authorization request being sent to the intermediary service 204. After sending the initial authorization request to the intermediary service 204, the acquirer may receive the following account information in response:

---
Transaction Identifier
Real Account Information

---

The acquirer 108 would then construct the following modified authorization request:

---
Transaction Identifier
Real Account Information
Real Track 2 Data (optional)
Industry Standard Code
Merchant Information
Transaction Amount
Transaction Items

---

For record-keeping purposes, and in order to ensure that authorization requests are correctly associated with received account information, a transaction identifier may be assigned to each transaction and used by the acquirer and the intermediary server to ensure that all sent and received messages are correctly correlated. The acquirer may store all initial authorization requests, received account information, and modified authorization requests in a data structure so that the acquirer or a third party may subsequently audit the information and confirm that transactions are being appropriately processed.

After the modified authorization request is generated, processing then proceeds to block 714 where the acquirer 108 sends the modified authorization request to the payment association 112. In block 716, the acquirer 108 receives an authorization or a denial in response to the modified authorization request. The acquirer 108 then completes the authorization process by sending the authorization or denial message to the point of purchase 106 in block 718. As discussed above, the acquirer 108 may also send the authorization or denial message to the intermediary service 204 so that the intermediary service 204 can send a receipt message to the customer's mobile device 206. The acquirer 108 may also send transaction details, such as the list of transaction items, to the intermediary service 204 so that the receipt message can include additional transaction details.

While the process 700 has been described as being implemented by the acquirer 108, it will be appreciated that process 700 can be implemented by any party that participates in the transaction approval process. For example, the payment association 112 or an issuing institution 110 may forward initial authorization requests to the intermediary service 204 in lieu of the acquirer forwarding the request. The account information is then returned to the payment association or issuing institution for further processing.

Figure 8:
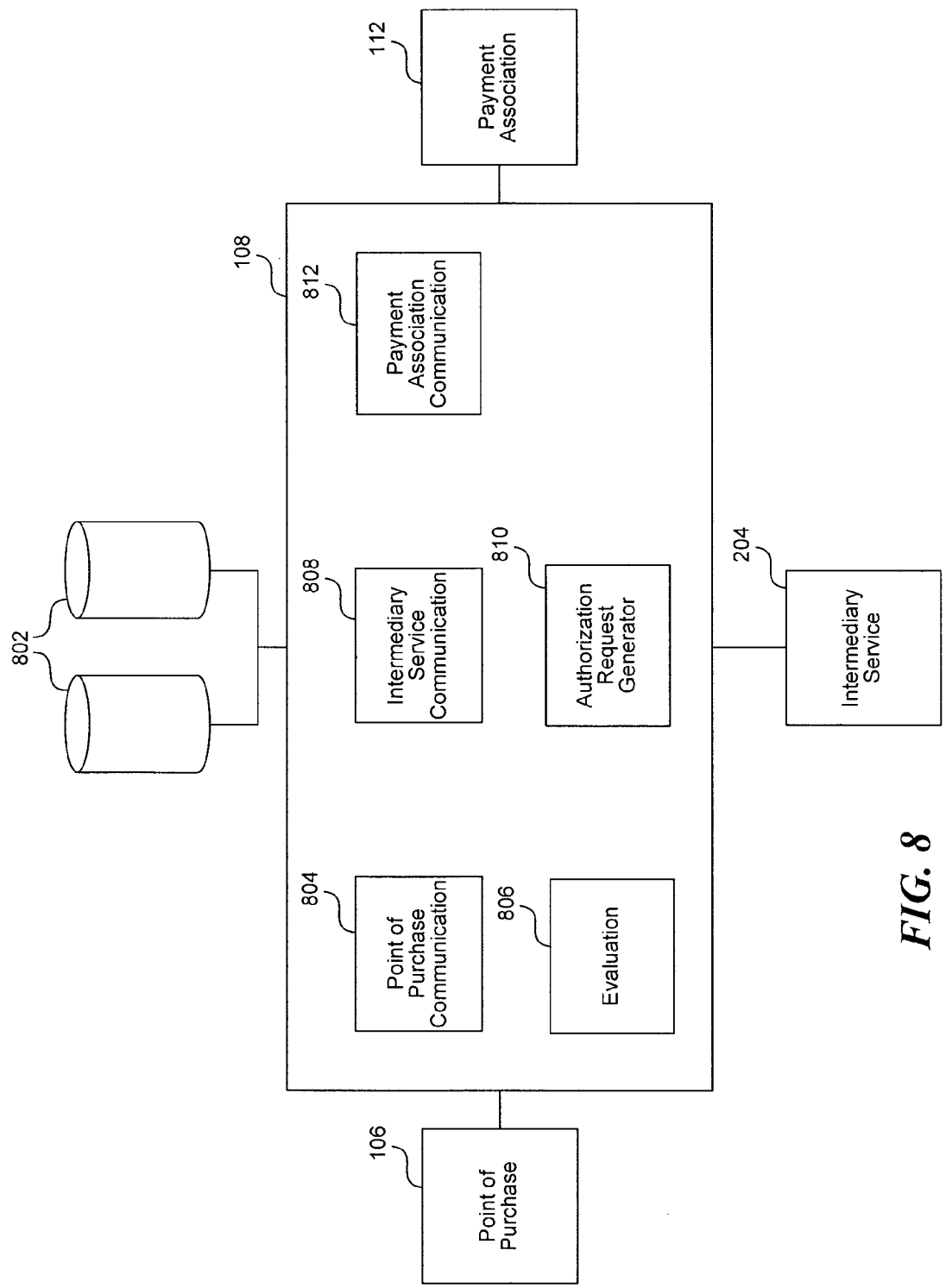
FIG. 8 is a logical block diagram of the acquirer.

FIG. 8 illustrates a logical block diagram of the acquirer 108 that implements the process 700 of FIG. 7. The acquirer 108 redirects certain authorization requests to the intermediary service 204 and generates modified authorization requests based on information provided by the intermediary service 204. As with the intermediary service 204 shown in FIG. 5, aspects of the acquirer 108 may be implemented as special-purpose circuitry, programmable circuitry, or as a combination of these. The modules in the acquirer 108 may be implemented in a single physical device or distributed over multiple physical devices and the functionality implemented by calls to remote services.

As discussed above, the acquirer 108 receives an initial transaction authorization request from the point of purchase 106 and transmits a modified authorization request to the issuing institution 110 via the payment association 112. The acquirer 108 also communicates with the intermediary service 204 to request account information associated with a particular authorization request and to receive the requested account information. The acquirer 108 also interacts with a storage component 802, which is configured to store information used to integrate with the intermediary service 204. In particular, the storage component 802 stores identifying information (such as ranges of account numbers or account number prefixes) that can be used to determine which authorization requests should be handled by the intermediary service 204. The storage component 802 may also store historical transaction information to be used for auditing or if a transaction is disputed.

The acquirer 108 includes various modules to assist in processing authorization requests. In particular, the acquirer 108 includes a point of purchase communication module 804, which is configured to communicate with the point of purchase 106 to receive initial authorization requests and transmit authorization or denial messages at the end of the transaction. The acquirer 108 also includes an evaluation module 806, which is configured to evaluate initial authorization requests according to the process 700 described above to determine if initial authorization requests should be sent to the intermediary service 204.

The acquirer 108 also includes an intermediary service communication module 808, which is configured to communicate with the intermediary service 204 to send authorization requests and to receive account information. The intermediary service communication module 808 then provides the account information to an authorization request generator module 810, which is configured to generate a modified authorization request based on the initial authorization request and the received account information. The modified authorization request is then provided to a payment association communication module 812, which is configured to communicate with the payment association 112 to send the modified authorization requests to the issuing institution 110. After the issuing institution 110 approves or denies a transaction, the payment association communication module 812 also receives an authorization or denial message from the payment association 112. The acquirer 108 then forwards the message to the point of purchase 106 and/or the intermediary service 204.

Figure 9:
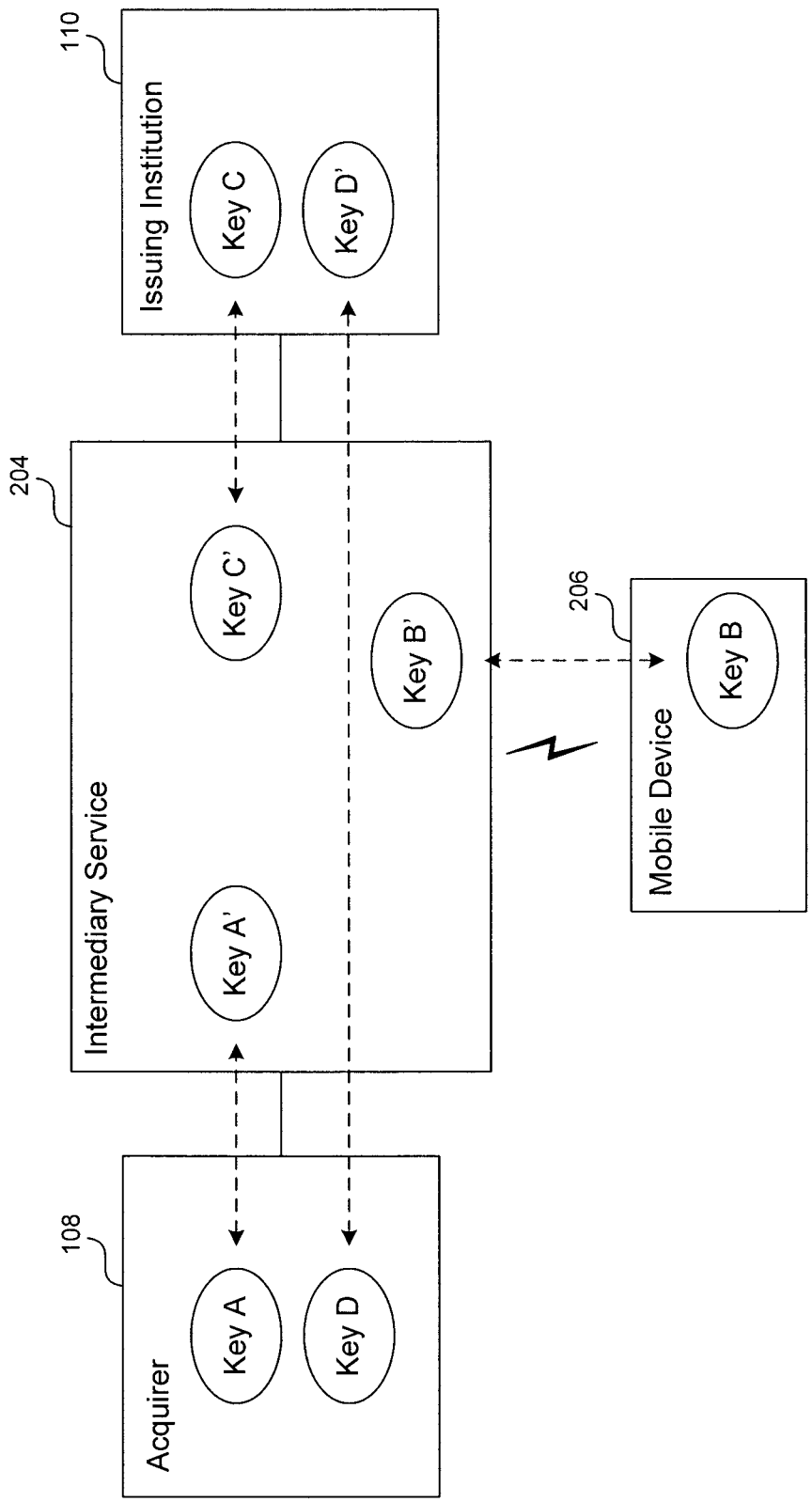
FIG. 9 is a block diagram of encrypted message routing through the intermediary service.

One of the advantages of the disclosed intermediary service 204 is that it allows routing of encrypted messages through the service without revealing sensitive information that is contained in the messages to the operator of the service. FIG. 9 is a block diagram depicting various message routing paths through the intermediary service 204. Complementary encryption keys are depicted as being maintained by different parties that participate in the processing of a financial transaction. For example, a key A that is maintained by acquirer 108 allows the acquirer to encrypt messages and communicate in a secure fashion with the intermediary service 204, which maintains a complementary key A' for decoding the encrypted messages. Similarly the intermediary service 204 maintains a key B' that allows it to communicate in a secure fashion with the mobile device 206, which maintains a complementary key B. Moreover, the intermediary service 204 also maintains a key C' that allows it to communication in a secure fashion with the issuing institution 110, which maintains a key C. Of note, however, is the ability of the acquirer 108 and the issuing institution 110 to exchange encrypted messages or portions of messages through the intermediary service without allowing the service to read or otherwise act on the contents of the messages. For example, certain portions of the point of purchase information from the initial authorization request (e.g., the specific products being purchased) may be encrypted by the acquirer 108 using an encryption key D. When the intermediary services 204 receives messages or portions of messages that are encrypted, the service copies the encrypted messages or portions of messages and forwards the copied messages to the issuing institution 110. The issuing institution 110 is able to decrypt the encrypted message or portion of the message using key D'. Similarly, the issuing institution 110 may encrypt account information using key D so that the information may be read only by the acquirer 108. An advantage of this is that the intermediary service 204 never has usable access to the encrypted information. This allows the acquirer to retain control over non-essential customer information, such as certain point of purchase information, and increases the privacy of the information. It also allows the issuing institution to pass certain account information, such as the card number and PIN number of a customer's debit card, to the acquirer 108, thereby allowing the acquirer to process financial transactions that might not have been previously available to the acquirer (e.g., such as during an online purchase).

From the foregoing, it will be appreciated that specific embodiments of the invention have been described herein for purposes of illustration, but that various modifications may be made without deviating from the invention. For example, those skilled in the art will further appreciate that the depicted flow charts may be altered in a variety of ways. The order of the steps may be rearranged, steps may be performed in parallel, steps may be omitted, or other steps may be included. Accordingly, the invention is not limited except as by the appended claims.

We claim:

1. A computer-implemented method for processing financial transaction data in a computing system including a processor and a storage area, the method comprising:

receiving an authorization request generated as a result of a transaction by a purchaser at a point of purchase via an acquirer configured to receive authorization requests from a plurality of points of purchase, wherein the authorization request includes a purchaser identifier and transaction information, the transaction information including a transaction amount, and wherein the purchaser identifier identifies the purchaser that initiated the transaction;

based on the authorization request, determining one or more stored value items to apply to the transaction, wherein each stored value item includes an associated value,
   wherein the one or more stored value items are selected from a plurality of stored value items stored in the storage area, and
   wherein the plurality of stored value items includes stored value items provided by a plurality of different third parties;

transmitting a transaction indication message to a mobile device associated with the purchaser identifier, wherein the transaction indication message includes information about the determined one or more stored value items;

receiving an indication from a user of the mobile device that at least one stored value item should be applied against the transaction;

applying the indicated at least one stored value item to pay a first portion of the transaction amount; and initiating a payment process to pay a remaining portion of the transaction amount by providing a modified transaction amount to the acquirer for submission to a payment association.

2. The method of claim 1, wherein a stored value item is a coupon for use in transactions with a specified merchant or for a specified product.

3. The method of claim 1, wherein the associated value is expressed as a currency amount.

4. The method of claim 1, wherein the associated value is expressed as a percentage of a portion of the transaction amount.

5. The method of claim 1, wherein the associated value is expressed in non-currency units and further comprising converting the non-currency units to a currency amount using a conversion rate before applying the indicated at least one stored value item to the first portion of the transaction amount.

6. The method of claim 5, wherein the conversion rate is determined based on characteristics of the transaction.

7. The method of claim 1, wherein the transaction information identifies a product purchased during the transaction, and wherein a stored value item is determined based on the identified product.

8. The method of claim 1, wherein a stored value item is associated with an applicable time or time period and the stored value item is determined based on a time associated with the transaction.

9. The method of claim 1, wherein a stored value item is determined based on a transaction history of the purchaser.

10. The method of claim 1, wherein initiating a payment process comprises:

generating a modified authorization request based on the received authorization request, wherein the modified authorization request includes a modified transaction amount based on the remaining portion of the transaction amount; and transmitting the modified authorization request to an issuing institution for authorization of payment.

11. The method of claim 1, wherein the one or more stored value items are uniquely associated with the purchaser identifier in the authorization request.

12. The method of claim 1, wherein a plurality of stored value items are contained in the storage area and each stored value item has associated transaction conditions under which a stored value item is to be applied, and wherein determining the one or more stored value items to apply to the transaction comprises selecting a stored value item from the plurality of stored value items in response to determining that the associated transaction conditions under which the stored value item is to be applied are satisfied by the authorization request.

13. The method of claim 12, wherein the associated transaction conditions include an identity of a product being purchased.

14. The method of claim 12, wherein the associated transaction conditions include a time period during which the stored value item is valid.

15. A system for processing financial transaction data, the system comprising:

a processor;

a storage component configured to store a plurality of stored value items,
wherein the plurality of stored value items includes stored value items provided by a plurality of different third parties;

a communication module configured to receive an authorization request generated as a result of a transaction by a purchaser at a point of purchase via an acquirer configured to receive authorization requests from a plurality of points of purchase, wherein the authorization request includes a purchaser identifier and transaction information, the transaction information including a transaction amount, and wherein the purchaser identifier identifies the purchaser that initiated the transaction; and a stored value module configured to:
based on the authorization request, determine one or more stored value item to apply to the transaction, wherein each stored value item includes an associated value,
wherein the one or more stored value items are selected from the plurality of stored value items stored in the storage area, and;
transmit a transaction indication message to a mobile device associated with the purchaser identifier, wherein the transaction indication message includes information about the determined one or more stored value items;
receive an indication from a user of the mobile device that at least one stored value item should be applied against the transaction;
apply the indicated at least one stored value item to pay a first portion of the transaction amount; and
initiate a payment process to pay a remaining portion of the transaction amount by providing a modified transaction amount to the acquirer for submission to a payment association.

16. The system of claim 15, wherein a stored value item is a coupon for use in transactions with a specified merchant or for a specified product.

17. The system of claim 15, wherein the associated value is expressed as a currency amount.

18. The system of claim 15, wherein the associated value is expressed in non-currency units and wherein the stored value module is further configured to convert the non-currency units to a currency amount using a conversion rate before applying the indicated at least one stored value item to the first portion of the transaction amount.

19. The system of claim 18, wherein the conversion rate is determined based on characteristics of the transaction.

20. The system of claim 15, wherein the transaction information identifies a product purchased during the transaction, and wherein the stored value item is determined based on the identified product.

21. The system of claim 15, wherein a stored value item is associated with an applicable time or time period and the stored value item is determined based on a time associated with the transaction.

22. The system of claim 15, wherein a stored value item is determined based on a transaction history of the purchaser.

23. The system of claim 15, wherein initiating a payment process comprises:

generating a modified authorization request based on the received authorization request, wherein the modified authorization request includes a modified transaction amount based on the remaining portion of the transaction amount; and transmitting the modified authorization request to an issuing institution for authorization of payment.

24. The system of claim 15, wherein the one or more stored value items are uniquely associated with the purchaser identifier in the authorization request.

25. The system of claim 15, wherein a plurality of stored value items are contained in the storage area and each stored value item has associated transaction conditions under which a stored value item is to be applied, and wherein determining the one or more stored value items to apply to the transaction comprises selecting a stored value item from the plurality of stored value items in response to determining that the associated transaction conditions under which the stored value item is to be applied are satisfied by the authorization request.

26. The system of claim 25, wherein the associated transaction conditions include an identity of a product being purchased.

27. The system of claim 25, wherein the associated transaction conditions include a time period during which the stored value item is valid.

28. A computer-readable medium containing instructions for processing financial transaction data in a computing system including a processor and an associated storage area, by a method comprising:
   receiving an authorization request generated as a result of a transaction by a purchaser at a point of purchase via an acquirer configured to receive authorization requests from a plurality of points of purchase, wherein the authorization request includes a purchaser identifier and transaction information, the transaction information including a transaction amount, and wherein the purchaser identifier identifies the purchaser that initiated the transaction;
   based on the authorization request, determining one or more stored value items to apply to the transaction, wherein the stored value item includes an associated value,
      wherein the one or more stored value items are selected from a plurality of stored value items stored in the storage area, and
      wherein the plurality of stored value items includes stored value items provided by a plurality of different third parties;
   transmitting a transaction indication message to a mobile device associated with the purchaser identifier, wherein the transaction indication message includes information about the determined one or more stored value items;
   receiving an indication from a user of the mobile device that at least one stored value item should be applied against the transaction;
   applying the stored value item to pay a first portion of the transaction amount; and
   initiating a payment process to pay a remaining portion of the transaction amount by providing a modified transaction amount to the acquirer for submission to a payment association.

29. The computer-readable medium of claim 28, wherein a stored value item is a coupon for use in transactions with a specified merchant or for a specified product.

30. The computer-readable medium of claim 28, wherein the associated value is expressed as a currency amount.

31. The computer-readable medium of claim 28, wherein the associated value is expressed in non-currency units and further comprising converting the non-currency units to a currency amount using a conversion rate before applying the indicated at least one stored value item to the first portion of the transaction amount.

32. The computer-readable medium of claim 31, wherein the conversion rate is determined based on characteristics of the transaction.

33. The computer-readable medium of claim 28, wherein the transaction information identifies a product purchased during the transaction, and wherein a stored value item is determined based on a product purchased during the transaction.

34. The computer-readable medium of claim 28, wherein a stored value item is associated with an applicable time or time period and the stored value item is determined based on a time associated with the transaction.

35. The computer-readable medium of claim 28, wherein a stored value item is determined based on a transaction history of the purchaser.

36. The computer-readable medium of claim 28, wherein initiating a payment process comprises:
   generating a modified authorization request based on the received authorization request, wherein the modified authorization request includes a modified transaction amount based on the remaining portion of the transaction amount; and
   transmitting the modified authorization request to an issuing institution for authorization of payment.

37. The computer-readable medium of claim 28, wherein the one or more stored value items are uniquely associated with the purchaser identifier in the authorization request.

38. The computer-readable medium of claim 28, wherein a plurality of stored value items are contained in the storage area and each stored value item has associated transaction conditions under which a stored value item is to be applied, and wherein determining the one or more stored value items to apply to the transaction comprises selecting a stored value item from the plurality of stored value items in response to determining that the associated transaction conditions under which the stored value item is to be applied are satisfied by the authorization request.

39. The computer-readable medium of claim 38, wherein the associated transaction conditions include an identity of a product being purchased.

40. The computer-readable medium of claim 38, wherein the associated transaction conditions include a time period during which the stored value item is valid.

* * * * *